United States Patent
Ito et al.

(10) Patent No.: US 8,294,801 B2
(45) Date of Patent: Oct. 23, 2012

(54) SOLID-STATE IMAGING DEVICE, IMAGING APPARATUS, PIXEL DRIVING VOLTAGE ADJUSTMENT APPARATUS, AND PIXEL DRIVING VOLTAGE ADJUSTMENT METHOD

(75) Inventors: Yoshiaki Ito, Tokyo (JP); Yusuke Oike, Kanagawa (JP)

(73) Assignee: Sony Corporation, Tokyo (JP)

(*) Notice: Subject to any disclaimer, the term of this patent is extended or adjusted under 35 U.S.C. 154(b) by 279 days.

(21) Appl. No.: 12/604,477

(22) Filed: Oct. 23, 2009

(65) Prior Publication Data

US 2010/0110261 A1 May 6, 2010

(30) Foreign Application Priority Data

Oct. 30, 2008 (JP) .................................. 2008-279472

(51) Int. Cl.
*H04N 5/335* (2011.01)
(52) U.S. Cl. .................... 348/311; 348/294; 348/312
(58) Field of Classification Search .................. None
See application file for complete search history.

(56) References Cited

U.S. PATENT DOCUMENTS

| | | | |
|---|---|---|---|
| 6,947,087 B2 | 9/2005 | Egawa et al. | |
| 7,995,124 B2 * | 8/2011 | Dai | 348/300 |
| 2001/0005227 A1 * | 6/2001 | Egawa et al. | 348/304 |
| 2005/0062867 A1 * | 3/2005 | Mabuchi | 348/308 |
| 2007/0096238 A1 | 5/2007 | Oike et al. | |
| 2007/0279506 A1 * | 12/2007 | Sato | 348/302 |

FOREIGN PATENT DOCUMENTS

| | | |
|---|---|---|
| JP | 2001-189893 | 7/2001 |
| JP | 2007-151069 | 6/2007 |

* cited by examiner

*Primary Examiner* — Luong T Nguyen
(74) *Attorney, Agent, or Firm* — SNR Denton US LLP

(57) ABSTRACT

A solid-state imaging device includes: a pixel array unit having arranged unit pixels, each having a charge generator generating signal charges, and a signal output unit having a charge transfer unit, and generating and outputting a processing-target signal corresponding to the signal charges; a driving controller driving the unit pixels, the driving controller sequentially driving the charge transfer unit; and a transfer driving voltage setting unit setting, on the basis of a pixel signal based on a saturated charge amount of the charge generator and a pixel signal based on an intermediate voltage retained charge amount retained in the charge generator after intermediate transfer in which charge transfer is performed at a level between a complete transfer level and an off level, the level of the intermediate voltage such that an actual intermediate voltage retained charge amount becomes the expectation value of the intermediate voltage retained charge amount.

9 Claims, 20 Drawing Sheets

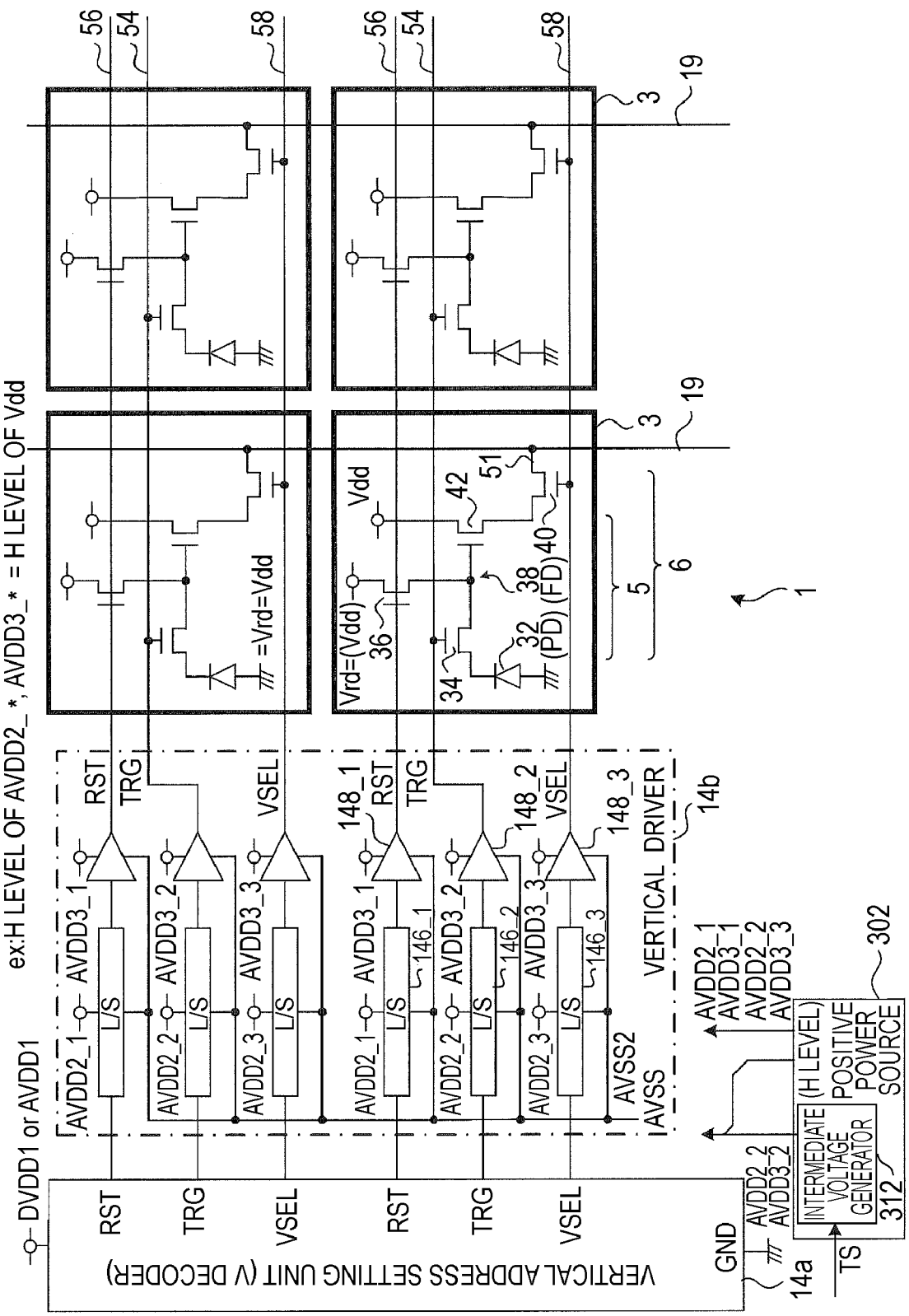

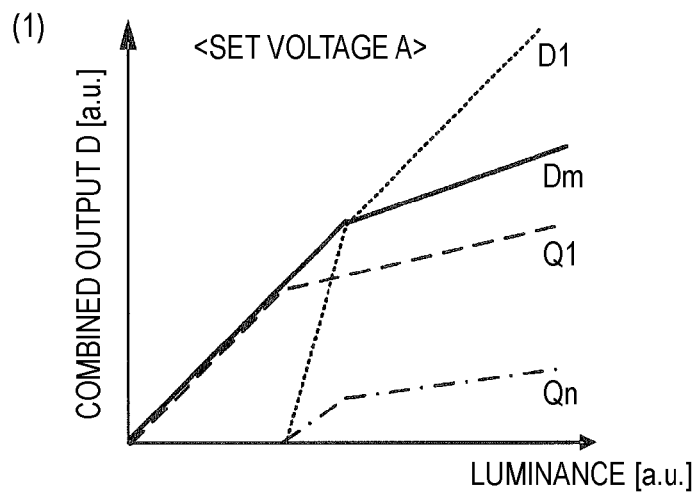
FIG.3C
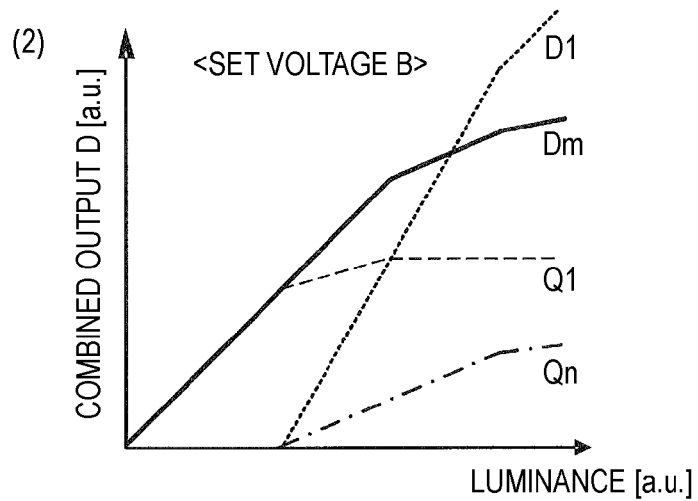
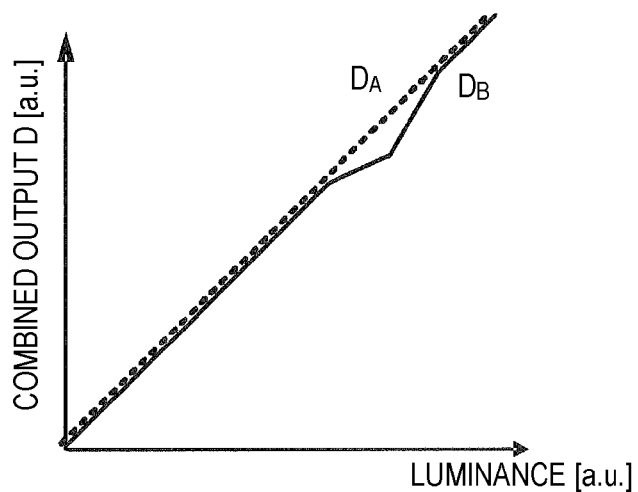
FIG.3D

FIG.4A
(1) NORMAL PIXEL 3a
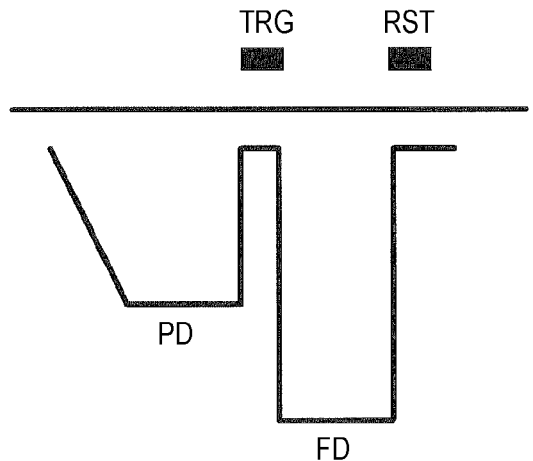
(2) SCRATCHED PIXEL 3b
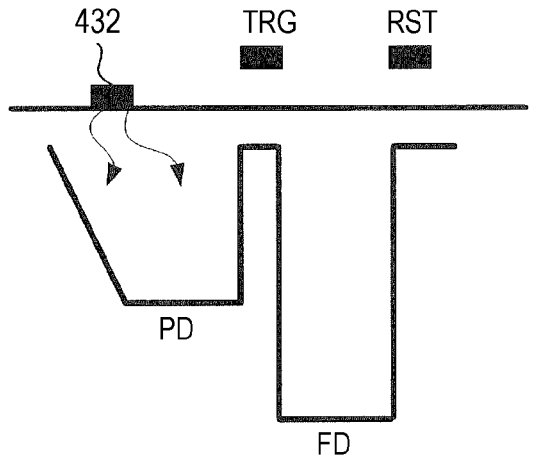
PD: CHARGE GENERATOR (PHOTODIODE)
FD: FLOATING DIFFUSION
TRG: READOUT SELECTION TRANSISTOR
RST: RESET TRANSISTOR
FIG.4B
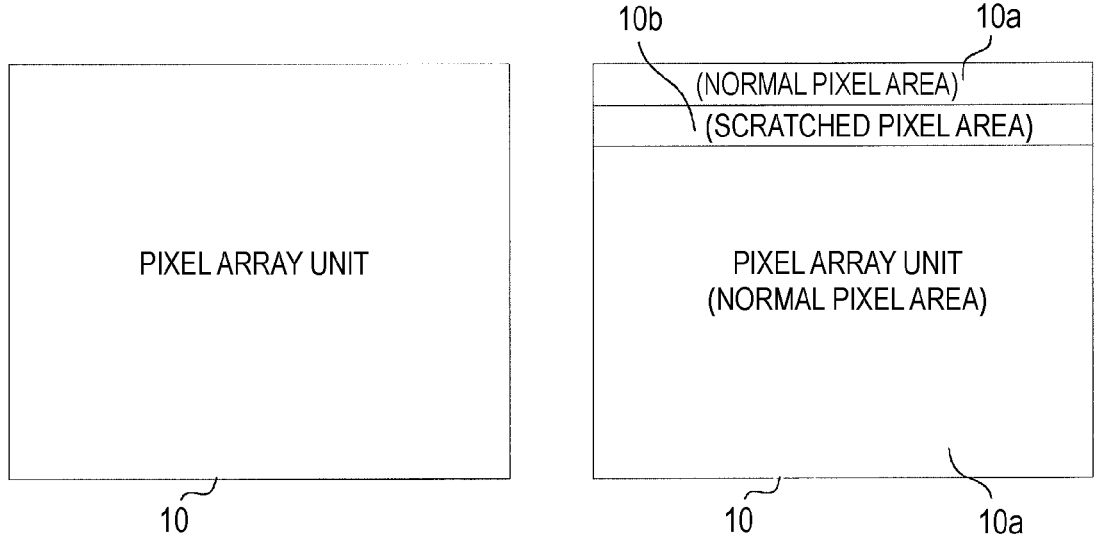

FIG.5A
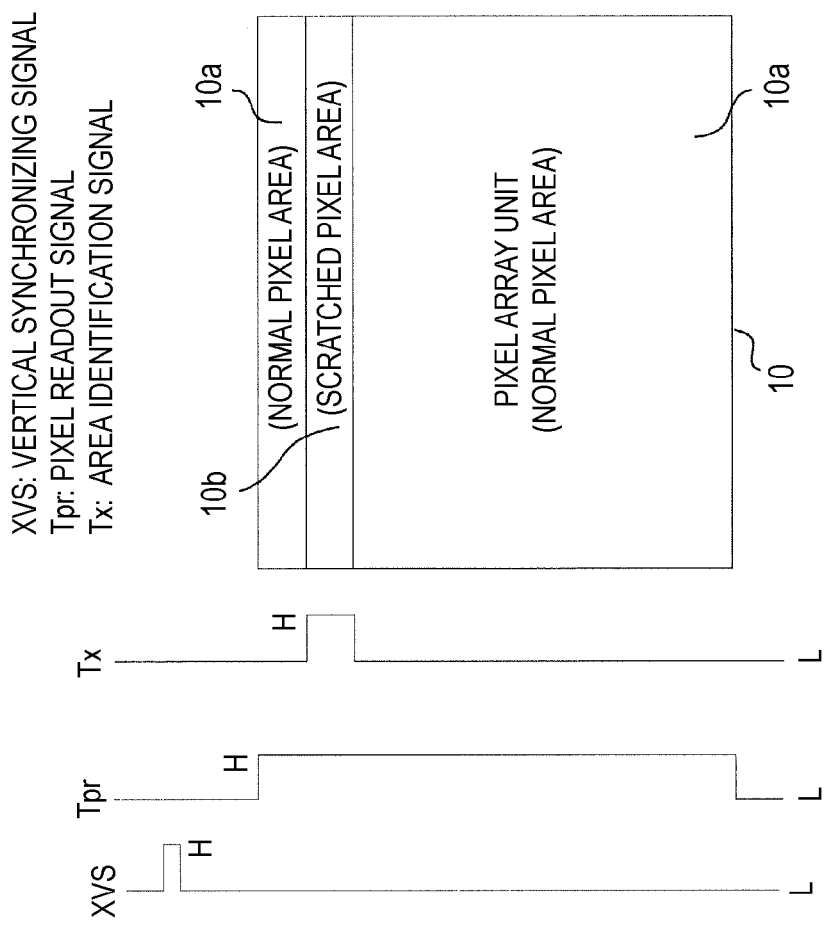
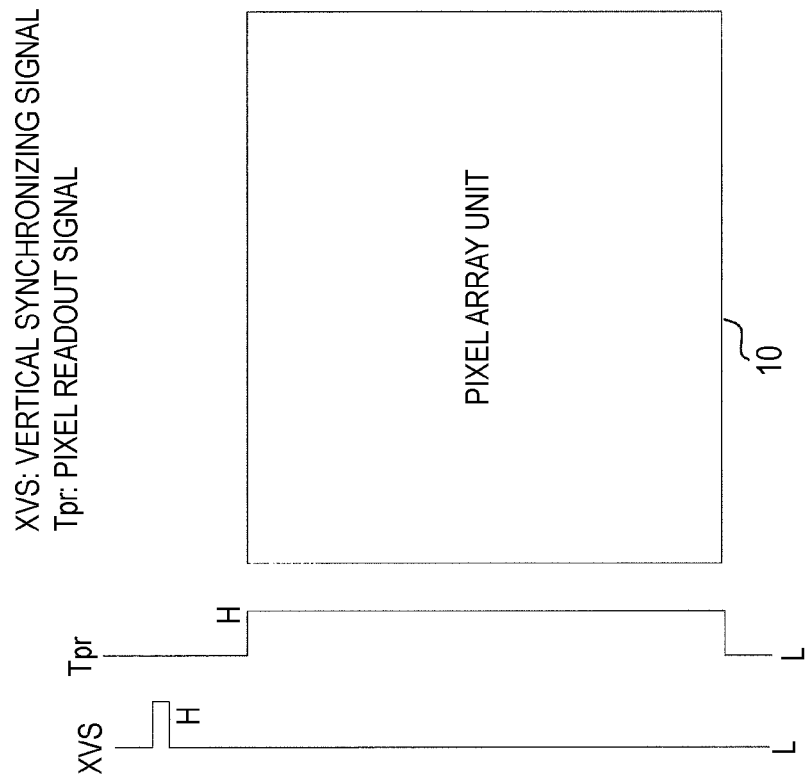

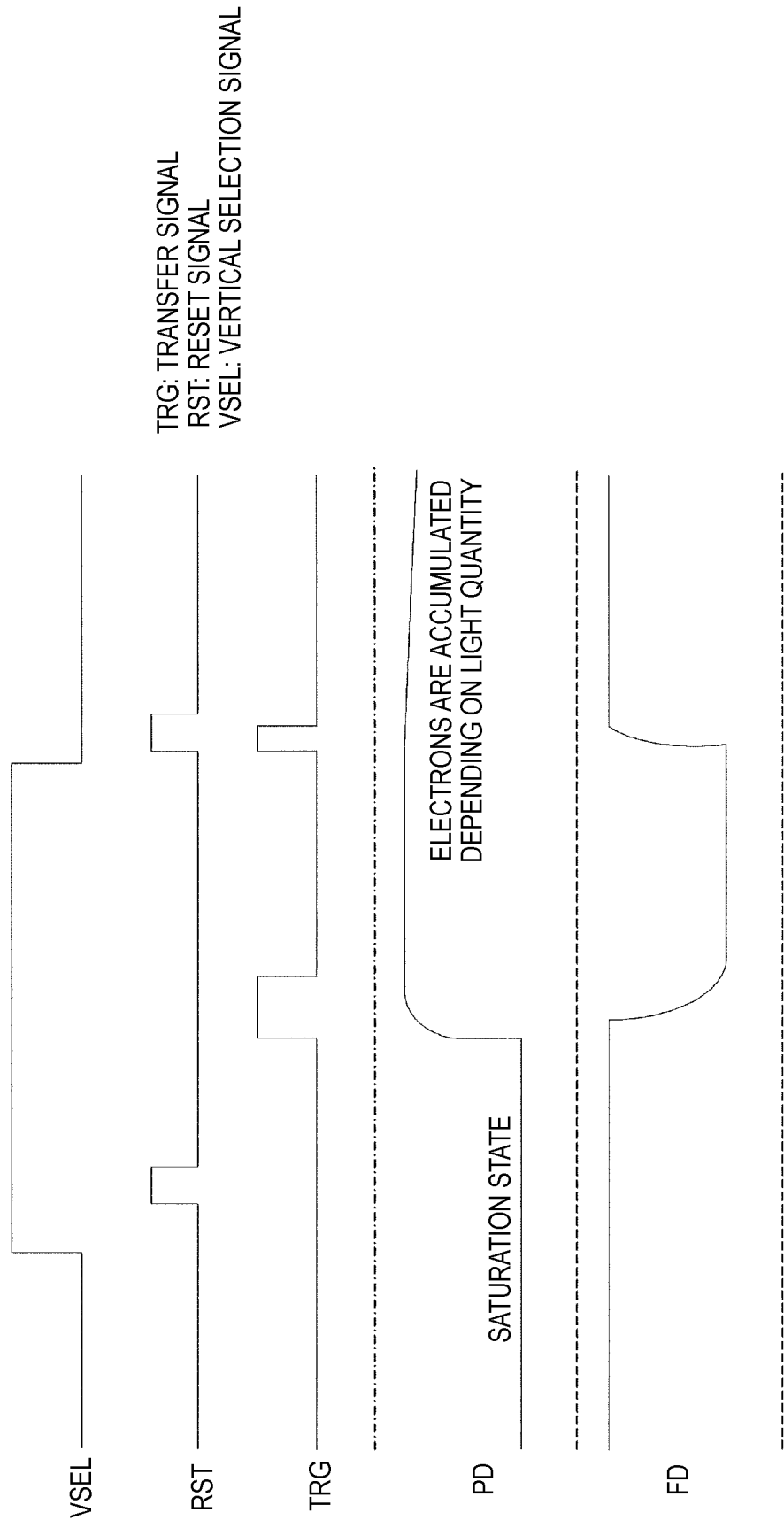

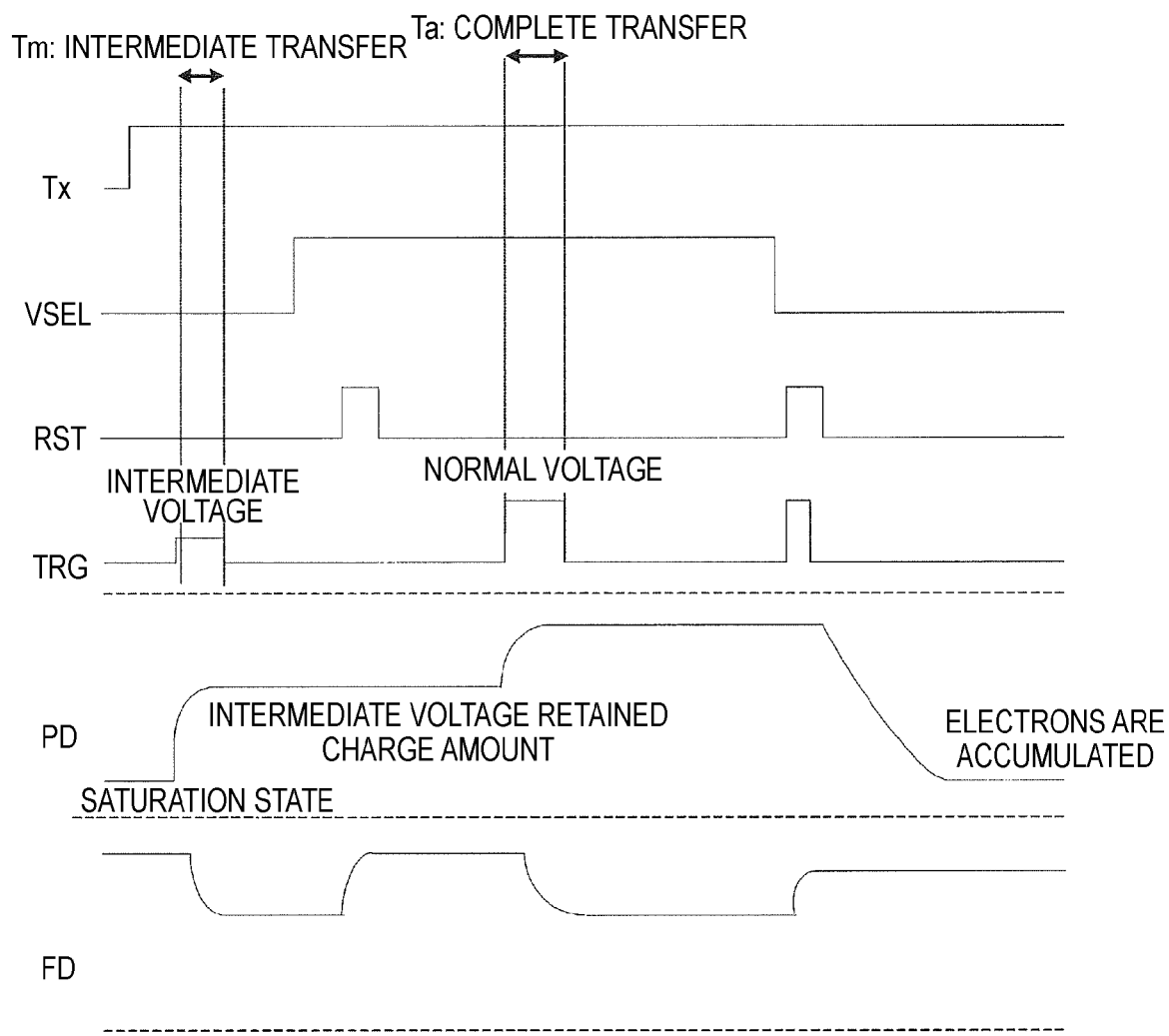

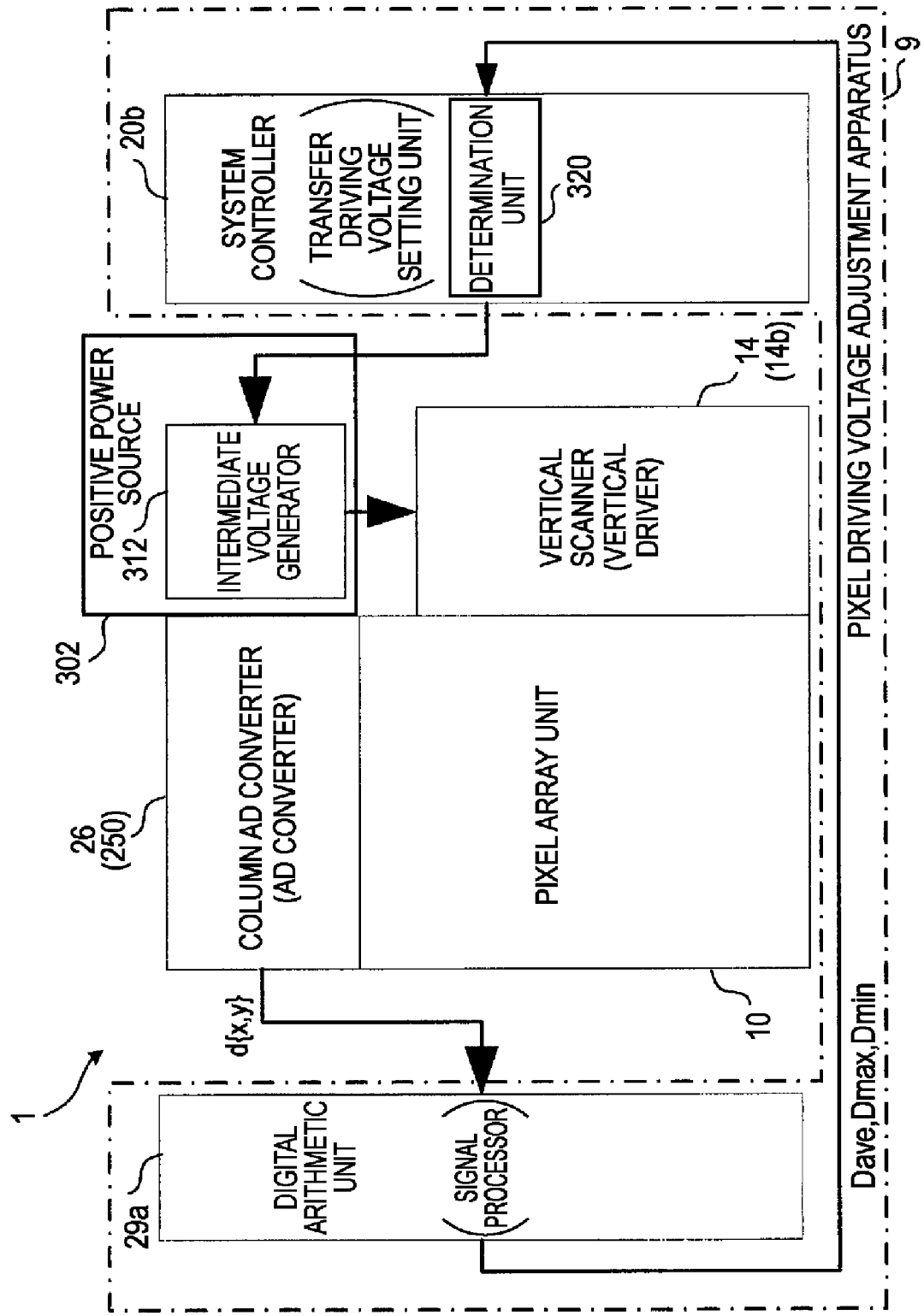

FIG. 7A
<SECOND EMBODIMENT (FIRST EXAMPLE): STRUCTURE OF UNIT PIXEL>
(1) 3-TRANSISTOR STRUCTURE
34+36: SWITCH UNIT
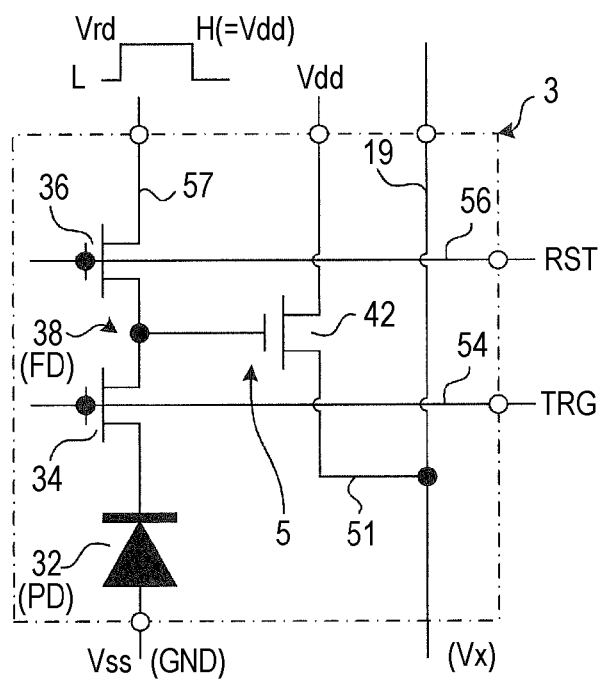
(2) 3-TRANSISTOR STRUCTURE
34+36: SWITCH UNIT
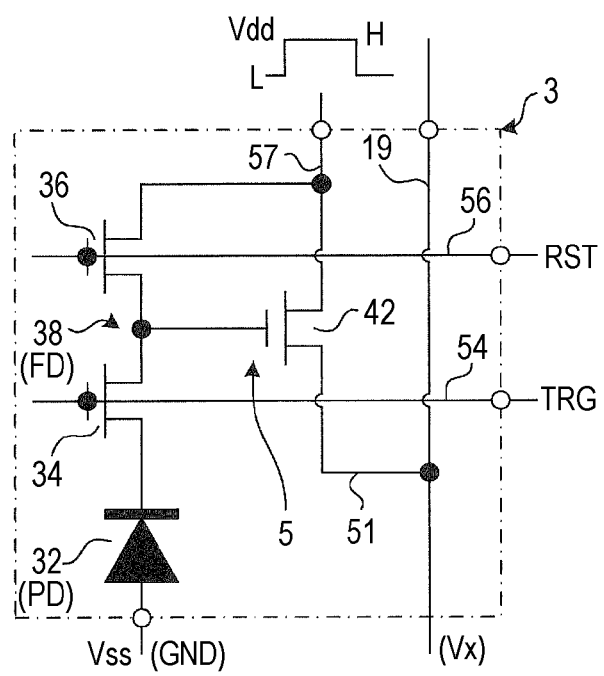

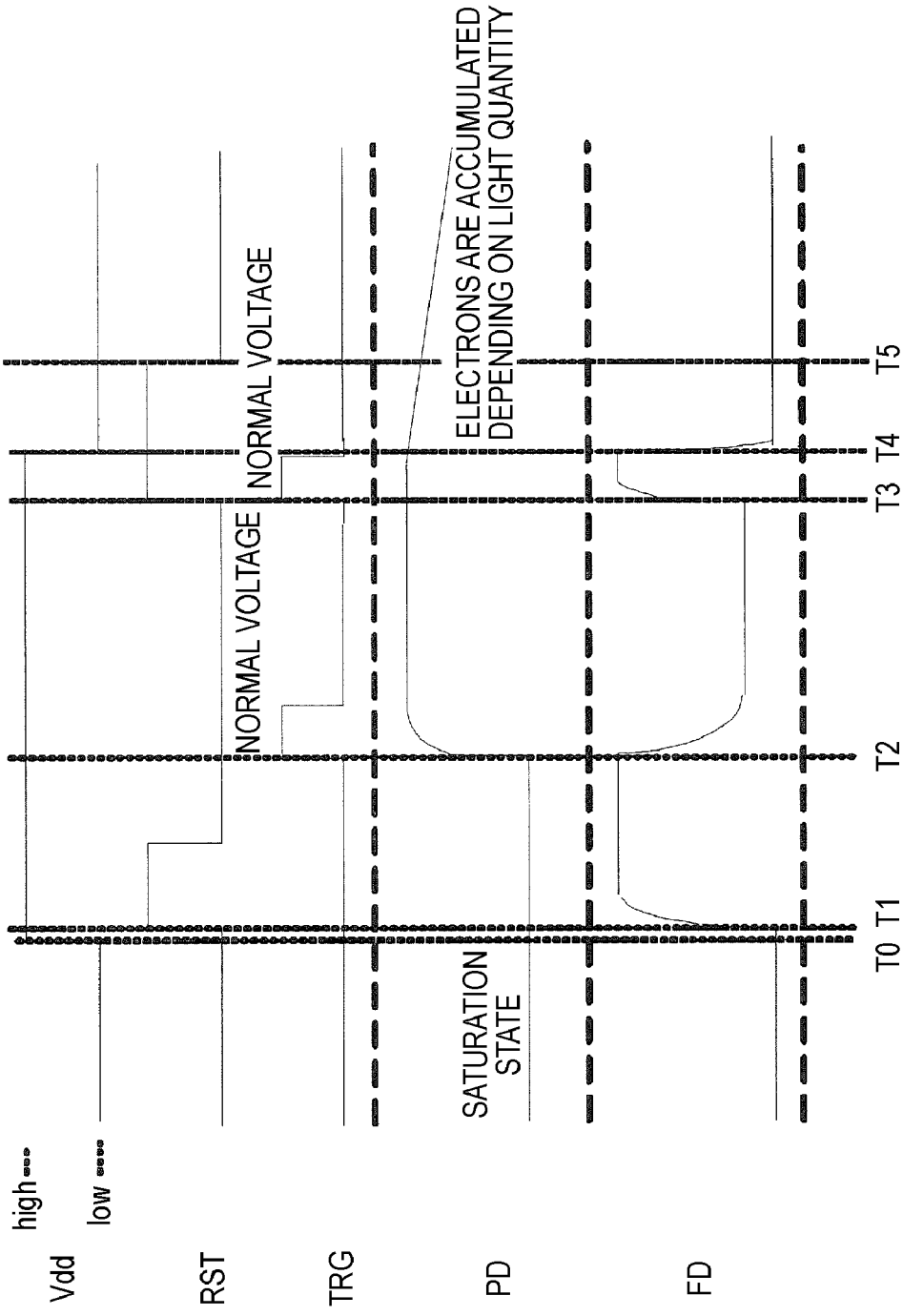

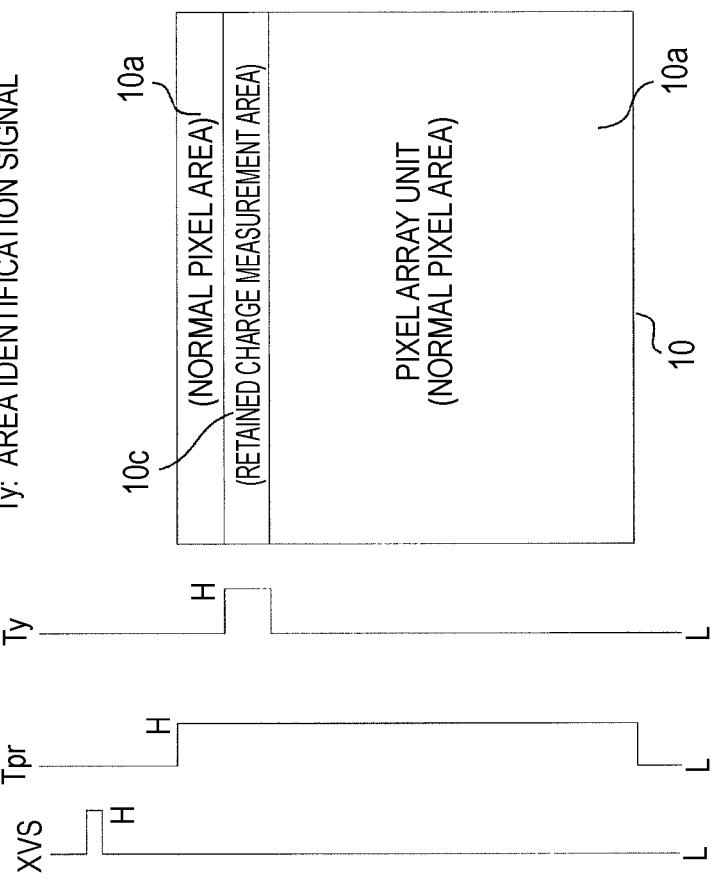
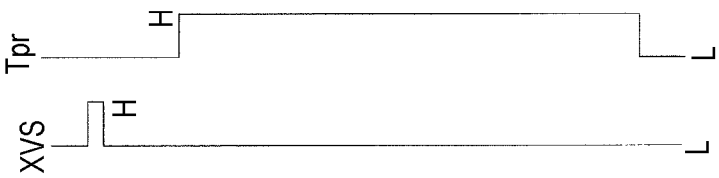
FIG.7C

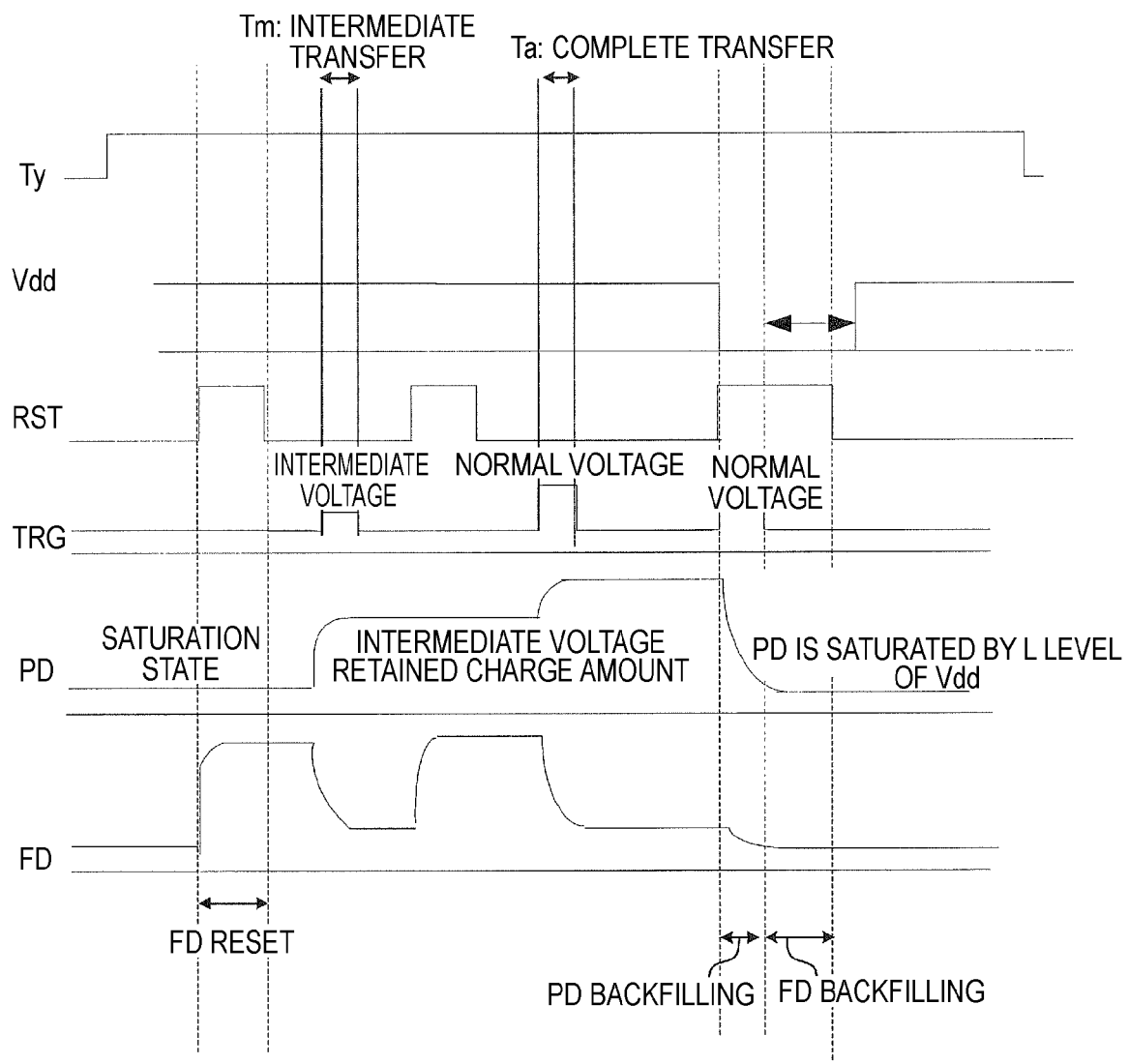

<SECOND EMBODIMENT (SECOND EXAMPLE): STRUCTURE OF UNIT PIXEL>

4-TRANSISTOR STRUCTURE

34+36: SWITCH UNIT

FIG. 8B
SECOND EMBODIMENT (SECOND EXAMPLE): STRUCTURE OF POWER SOURCE UNIT
(1)
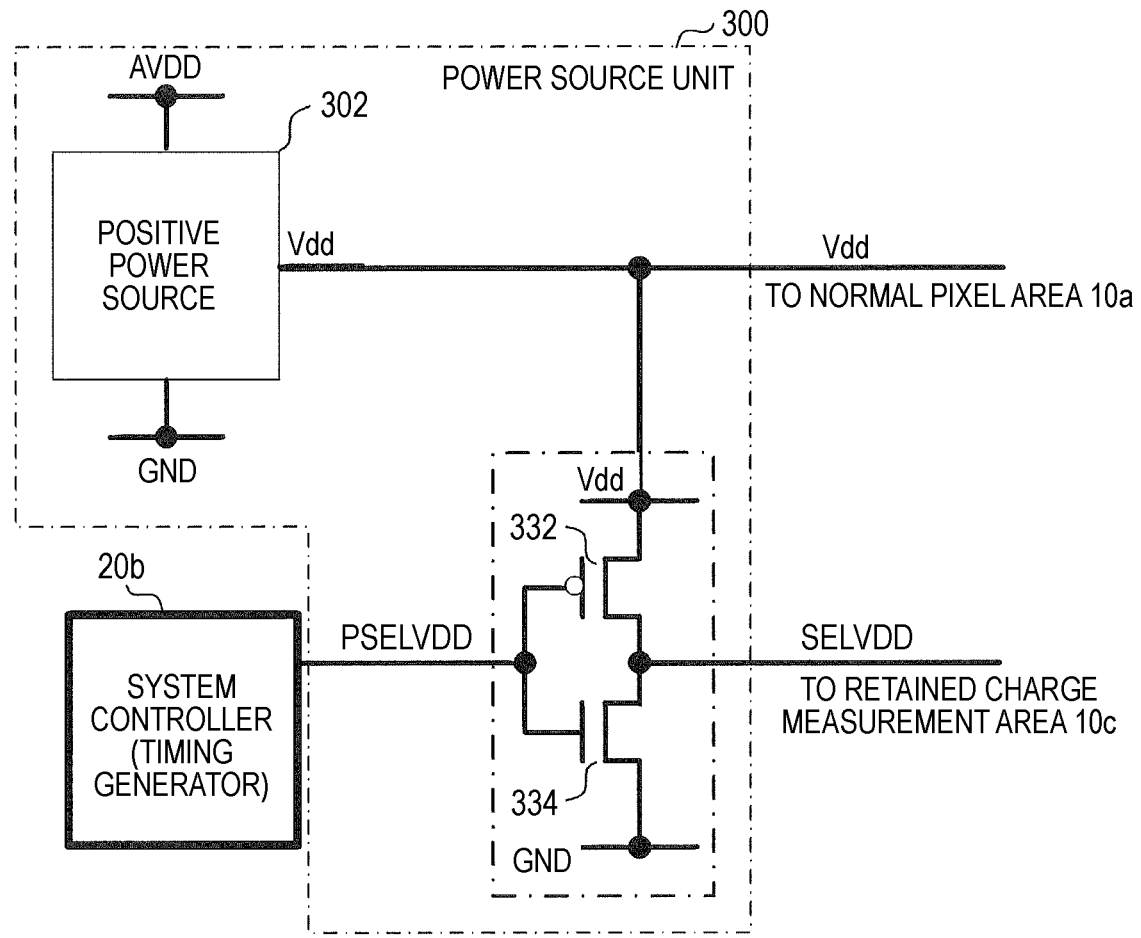
(2)
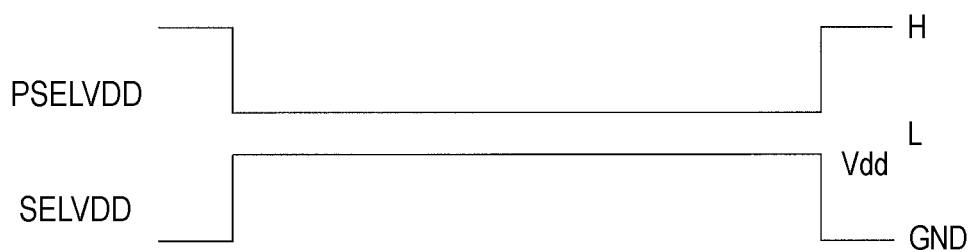

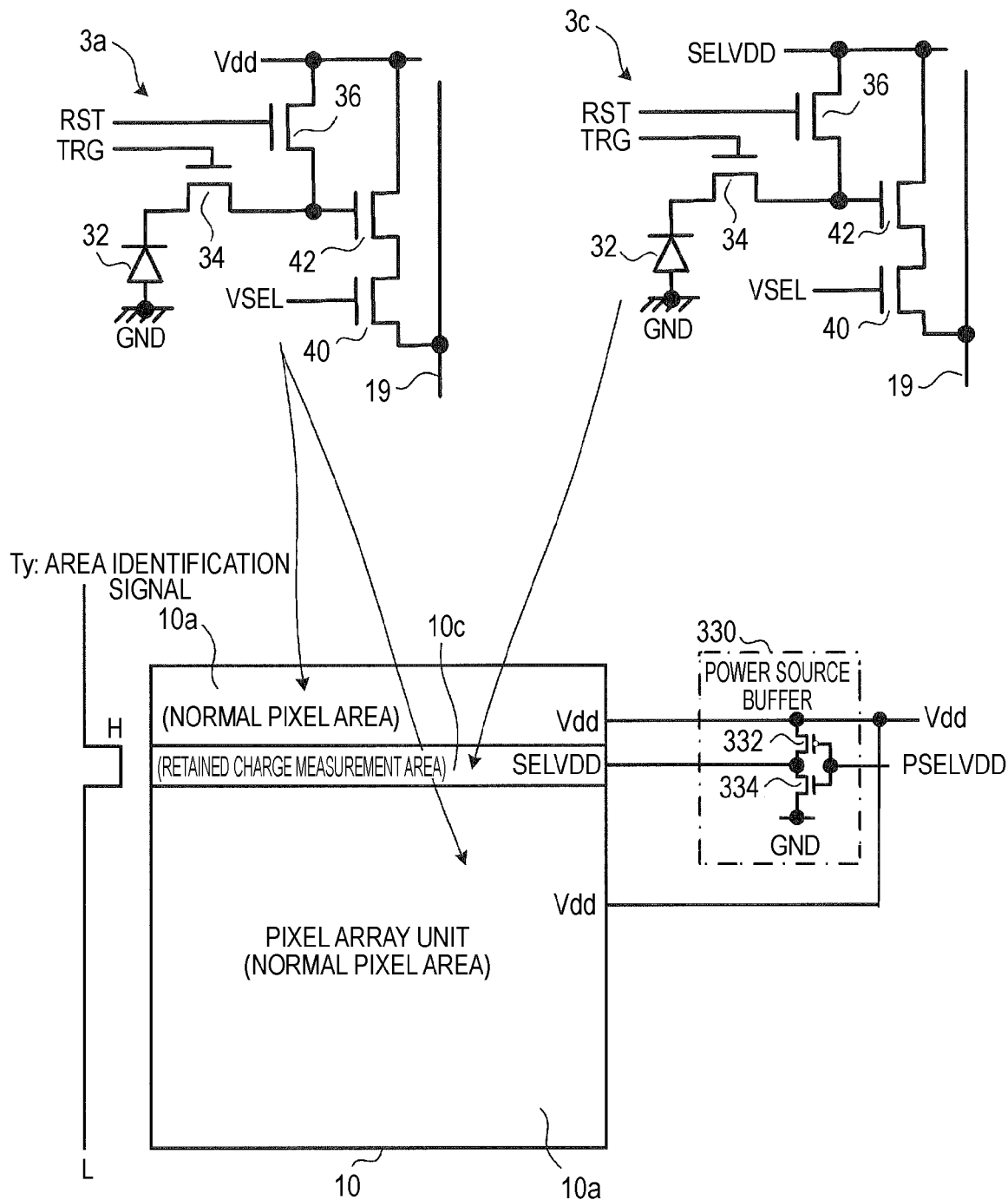

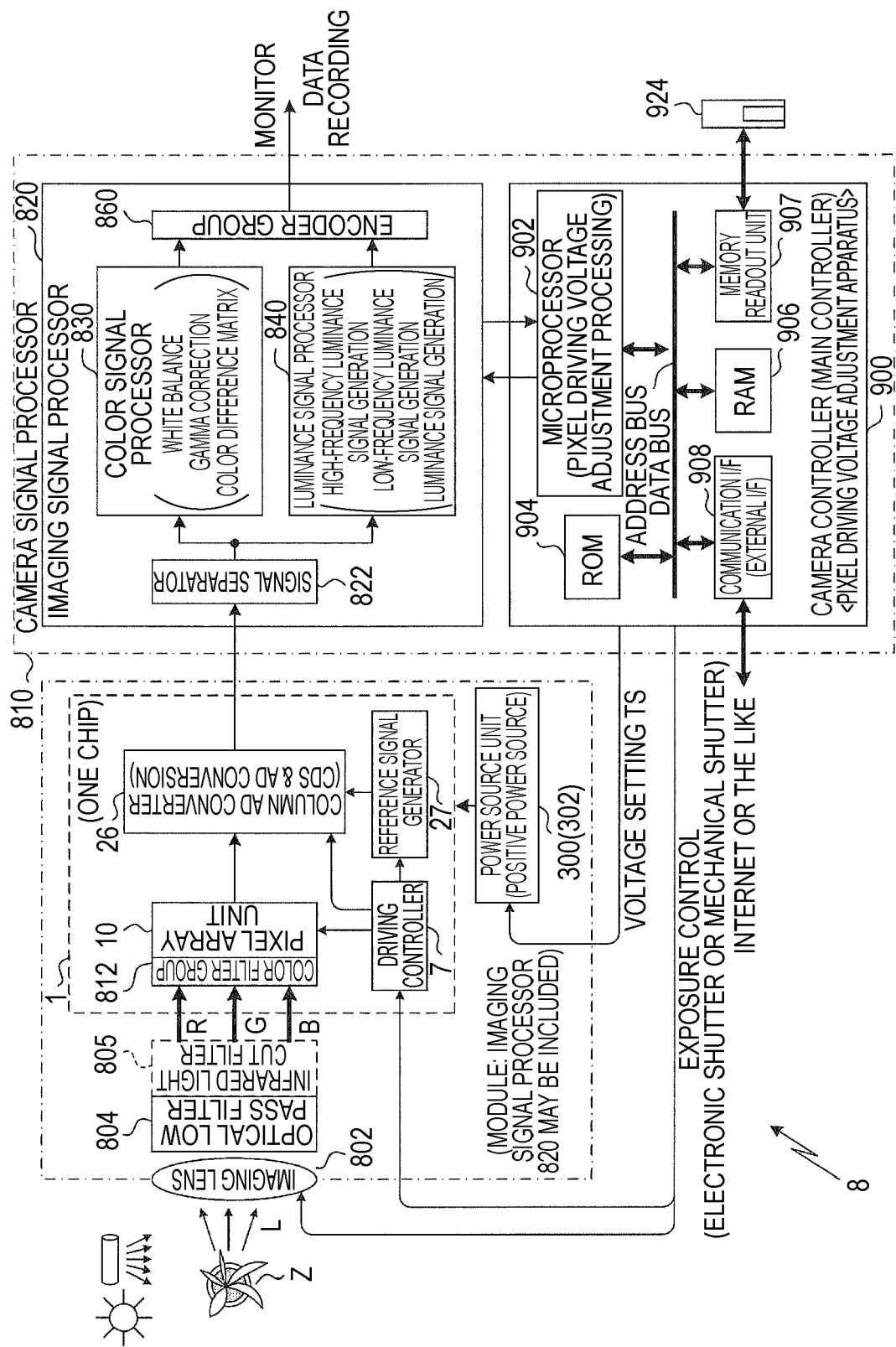

SOLID-STATE IMAGING DEVICE, IMAGING APPARATUS, PIXEL DRIVING VOLTAGE ADJUSTMENT APPARATUS, AND PIXEL DRIVING VOLTAGE ADJUSTMENT METHOD

BACKGROUND OF THE INVENTION

1. Field of the Invention

The present invention relates to a solid-state imaging device, an imaging apparatus, a pixel driving voltage adjustment apparatus, and a pixel driving voltage adjustment method. In particular, the present invention relates to a scheme for setting a transfer driving voltage level to a suitable value in a solid-state imaging device which sequentially performs charge transfer at a plurality of different transfer driving voltage levels.

2. Description of the Related Art

In various fields, a semiconductor device (in particular, called a solid-state imaging device) is used which detects signal charges by using a charge generator (a so-called sensor unit, such as a photodiode or the like), which is sensitive to electromagnetic waves from the outside, such as light or radioactive rays, and acquires an image on the basis of an electrical signal (pixel signal) according to the amount of the detected signal charges.

For example, in the field of video equipment, such as video cameras or digital still cameras, a CCD (Charge Coupled Device) type or an MOS (Metal Oxide Semiconductor) or CMOS (Complementary Metal-oxide Semiconductor) type solid-state imaging device is used which detects light (an example of electromagnetic waves) from among the physical quantities.

The solid-state imaging devices includes an amplification type solid-state imaging device in which a pixel signal generator, which generates a pixel signal according to the signal charges generated by the charge generator, is structured with pixels of an amplification type solid-state imaging device (APS; Active Pixel Sensor, also called a gain cell), which has an amplification driving transistor. For example, many CMOS type solid-state imaging devices are structured as such.

This amplification type solid-state imaging device is structured such that, in order to read out the pixel signal to the outside, address control is performed on a pixel portion having arranged a plurality of unit pixels, and a signal from each unit pixel is selected and read. That is, the amplification type solid-state imaging device is an example of an address control type solid-state imaging device.

A solid-state imaging device is used under various environmental conditions, so the input level of electromagnetic waves to the charge generator varies over a wide range. For example, in the case of outdoor photographing during daylight hours, the solid-state imaging device is used with an extremely large amount of incident light. In this case, a satisfactory image without saturation of a subject on the high luminance side is desired. Meanwhile, in the case of outdoor photographing during nighttime hours, the solid-state imaging device is used with an extremely small amount of incident light. In this case, an image with a satisfactory S/N ratio without a subject on the low luminance side not being buried with noise is desired. When a relatively dark subject is imaged under the condition that a high-luminance subject is present in the background, for example, when a person near a window is photographed from indoors, that is, in the case of a photographing scene with high contrast in which a bright subject and a dark subject are mixed, an image with a wide dynamic range from the person on the low luminance side to the background color of the window on the high luminance side is desired.

In order to obtain an image with a wide dynamic range, there is a need to set a long charge accumulation time with respect to a pixel with a low input level of electromagnetic waves, thereby realizing a high S/N ratio, and to avoid saturation with respect to a pixel with a high input level of electromagnetic waves. As the scheme to meet such a need, for example, there are the schemes described in JP-A-2001-189893 and JP-A-2007-151069. In all cases, a voltage (called an intermediate voltage) which does not reach a normal complete transfer level is used as a control voltage of a charge transfer unit (transfer gate, transfer transistor, and a readout selection transistor) which reads out the signal charges of a charge generator, and the readout of the signal charges is performed multiple times.

With these schemes, intermediate transfer is performed to drive the charge transfer unit with an intermediate voltage, and then complete transfer is performed to drive the charge transfer unit with a normal voltage. When the input level of electromagnetic waves is low, the signal charges generated by the charge generator for a predetermined period are not discarded to the pixel signal generator by the intermediate transfer, but are completely transferred together with the signal charges further generated by the charge generator for a subsequent period. Thus, a long charge accumulation time is set, so a high S/N ratio is realized. When the input level of electromagnetic waves is high, a part of the signal charges generated by the charge generator for a predetermined period are discarded to the pixel signal generator by the intermediate transfer so as to limit the saturation of the charge generator, and the combined components of the signal charges generated by the charge generator for a subsequent period and the remaining signal charge which are not discarded by the intermediate transfer are completely transferred.

While depending on the circuit structure or driving timing of the pixel signal generator, the pixel signal by the intermediate transfer and the pixel signal by the complete transfer maybe separately read out. Alternatively, when the pixel circuit is structured such that a charge accumulator is provided on the pixel signal generator side, the pixel signal may be read out in a state where the signal charges by the intermediate transfer and the signal charges by the complete transfer are added. In the former case, the pixel signal acquired by the intermediate transfer and the pixel signal acquired by the complete transfer are added, so a final pixel signal is acquired.

SUMMARY OF THE INVENTION

However, although details will be described in connection with embodiments, the inventors have experimented and understood that, in JP-A-2001-189893 and JP-A-2007-151069, a certain set value of an intermediate voltage at the time of the intermediate transfer generates significant noise according to the conditions. This point is not described in JP-A-2001-189893 and JP-A-2007-151069. The inventors have searched this phenomenon and have understood that a suitable setting condition for the intermediate voltage, in which no noise is generated, differs according to the devices (solid-state imaging devices), and is influenced by environmental conditions (in particular, temperature).

There is a need for a scheme which can read out signal charges multiple times by using a plurality of transfer driving voltage levels of a charge transfer unit, thereby obtaining a satisfactory image with a good S/N ratio from a small signal to a large signal without causing saturation, and setting the transfer driving voltage level reliably and appropriately.

Although details will be described in connection with the embodiments, according to the inventors' experiment and discussion based on the experiment result, it has been found that if the complete transfer charge amount which is read by the complete transfer when charge accumulation has passed after the intermediate transfer is disturbed and information deletion occurs, noise is generated. So if no information deletion, the intermediate voltage is appropriately set and noise is not generated. In the case that the signal charges are read out multiple times by using a plurality of transfer driving voltage levels of the charge transfer unit, an image is formed by a combination of the pixel signal based on the intermediate transfer charge amount and the pixel signal based on the complete transfer charge amount. Noise is generated when there is information deletion in the complete transfer charge amount of the intermediate transfer charge amount and the complete transfer charge amount to be combined. The inventors have found that the phenomenon causing information deletion depends on the intermediate voltage retained charge amount which is retained in the charge generator after the intermediate transfer as well as the level of the saturated charge amount.

The invention has been attained focusing on this point. Specifically, an intermediate voltage retained charge amount which does not disturb the complete transfer charge amount is set as an expectation value, an actual saturated charge amount and an actual intermediate voltage retained charge amount are specified, and the level of the intermediate voltage is set such that the actual intermediate voltage retained charge amount becomes the expectation value of the intermediate voltage retained charge amount.

For this reason, with the scheme of the invention, first, a pixel signal, which is based on a saturated charge amount when the charge generator is saturated, and a pixel signal, which is based on an intermediate voltage retained charge amount which is retained in the charge generator in a state where a transfer driving voltage level is at a level between a complete transfer level which enables the saturated charge amount of the charge generator to be completely transferred to the signal output unit and an off level which turns off the charge transfer unit, are acquired from the solid-state imaging device. Then, an index value for determination is calculated on the basis of the respective pixel signals, the index value is compared with the expectation value of the intermediate voltage retained charge amount, and the level of the intermediate voltage is set such that the actual intermediate voltage retained charge amount becomes the expectation value of the intermediate voltage retained charge amount.

One embodiment of the invention can adopt a scheme in which the setting of the voltage level for the intermediate transfer within the transfer driving voltage level (intermediate voltage setting) is adjusted for each device or use environment. For each device, the saturated charge amount and the intermediate voltage retained charge amount are specified, and the intermediate voltage is set to a suitable level on the basis of the result. Therefore, the setting of the intermediate voltage can approach a theoretical value without depending on the devices or use environment, and thus it is possible to assure that there is no image quality disturbance.

BRIEF DESCRIPTION OF THE DRAWINGS

FIG. 2 is a diagram showing the solid-state imaging device of this embodiment focusing on an interface of a vertical scanner and a pixel array unit.

FIG. 3C is a diagram illustrating combined outputs of signals which are obtained in the intermediate transfer and the complete transfer with a plurality of set values of an intermediate voltage.

FIG. 3D is a diagram illustrating a difference in the combined output due to a difference in the set value of the intermediate voltage.

FIG. 4A is a schematic sectional view illustrating the pixel structure of one pixel in which part of unit pixels are processed by an intermediate voltage setting adjustment processing of the first embodiment.

FIG. 4B is a plan view illustrating the structure of the entire pixel array unit, in which some of the unit pixels are modified, in the intermediate voltage setting adjustment processing of the first embodiment.

FIG. 5A is a diagram illustrating the relationship between an area identification signal for identifying a normal pixel area and a scratched pixel area, and a pixel array unit according to the first embodiment.

FIG. 5B is a timing chart illustrating the operation when a pixel signal is read out during a period in which an area identification signal is at an L level, according to the first embodiment.

FIG. 5C is a timing chart illustrating the operation when a pixel signal is read out during a period in which an area identification signal is at an H level, according to the first embodiment.

FIG. 6 is a diagram showing a structure example of a feedback loop for adjustment of a transfer driving voltage level (in particular, an intermediate voltage level) of a transfer pulse for each device according to this embodiment.

FIG. 7A is a diagram showing a unit pixel having a 3-TR structure to which a second embodiment (second example) having a scheme to adjust an intermediate voltage is applied.

FIG. 7B is a timing chart illustrating the normal driving timing of the unit pixel having the 3-TR structure shown in FIG. 7A.

FIG. 7C is a diagram illustrating the relationship between an area identification signal for identifying a normal pixel area and a retained charge measurement area which are applied to the second embodiment (first example), and a pixel array unit.

FIG. 7D is a timing chart illustrating the driving timing of the unit pixel having the 3-TR structure shown in FIG. 7A according to the second embodiment (first example).

FIG. 8B is a diagram showing a structure example of a power source unit which is applied to the second embodiment (second example).

FIG. 8C is a diagram illustrating the relationship among an area identification signal for identifying a normal pixel area and a retained charge measurement area which are applied to the second embodiment (second example), a pixel array unit, and a pixel power source.

FIG. 9 is a diagram showing the schematic structure of an imaging apparatus of a third embodiment which uses the same scheme as the solid-state imaging device of the first or second embodiment.

DESCRIPTION OF THE PREFERRED EMBODIMENTS

Hereinafter, embodiments of the invention will be described in detail with reference to the drawings. In the following embodiments, respective functional elements will be appended with capital letters A, B, C, . . . as references so as to be distinguished from each other, but the references will be omitted unless the functional elements are particularly distinguished from each other. The same is applied to the drawings.

Hereinafter, a description will be made regarding an example where a CMOS solid-state imaging device, which is an example of an X-Y addressing solid-state imaging device, is used as a device. Further, unless otherwise noted, the description will be made assuming that in the CMOS solid-state imaging device, all unit pixels are of an NMOS (n-channel MOS) type, and signal charges are negative charges (electrons). This is just an example, and a target device is not limited to a MOS type solid-state imaging device. For example, the unit pixels may be of a PMOS (p-channel MOS) type, and the signal charges maybe positive charges (holes). All embodiments that will be described below may be similarly applied to all semiconductor devices for physical quantity distribution detection which includes a charge generator sensitive to electromagnetic waves from the outside, such as light or radioactive rays, and a charge transfer unit reading out the signal charges from the charge generator.

<Solid-State Imaging Device: Basic Structure>

Figure 1:
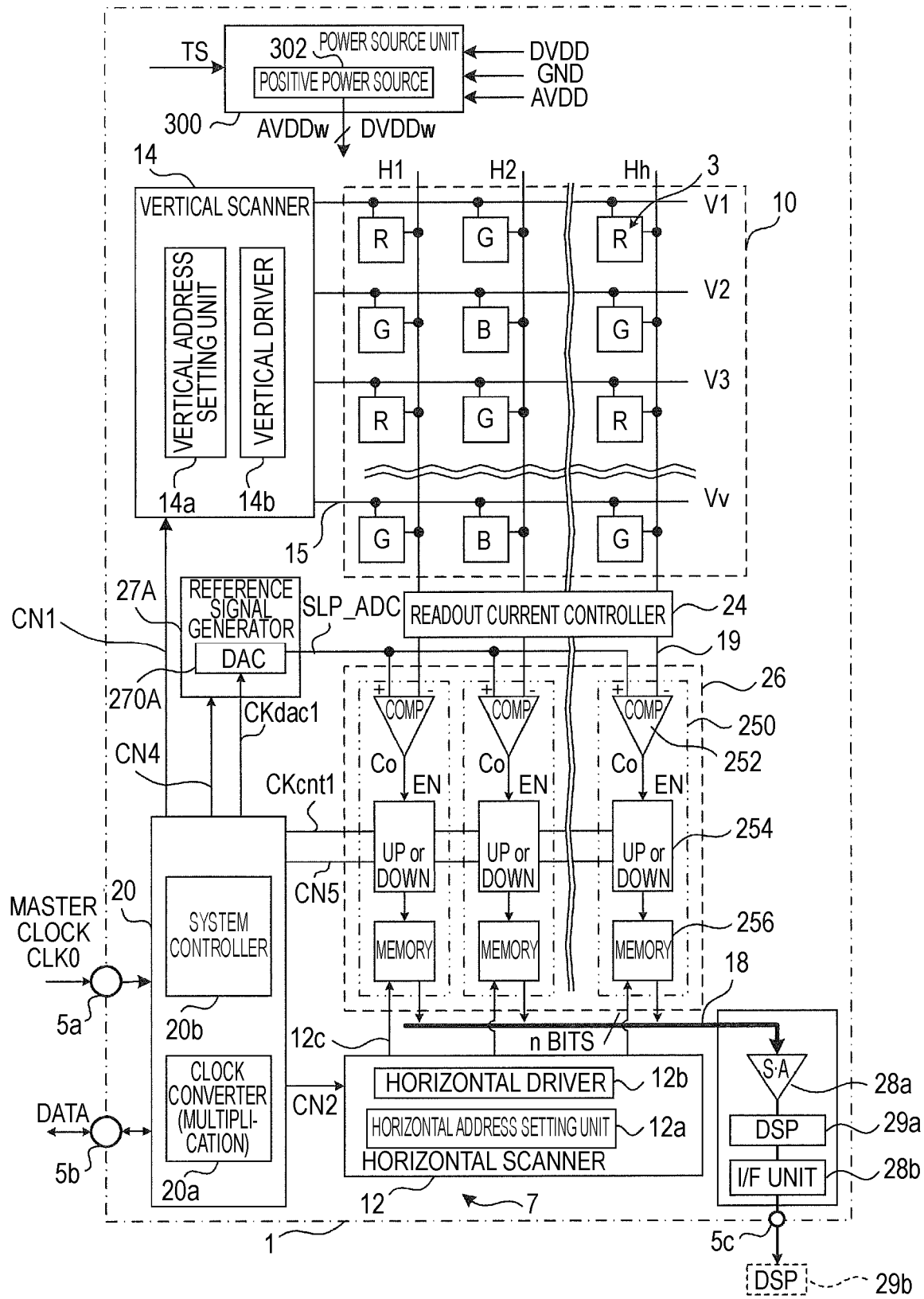
FIG. 1 is a basic structure diagram of a CMOS type solid-state imaging device (CMOS image sensor) as an embodiment of a solid-state imaging device according to the invention.

FIG. 1 is a basic structure diagram of a CMOS type solid-state imaging device (CMOS image sensor) which is an embodiment of a solid-state imaging device according to the invention.

The solid-state imaging device 1 has a pixel array unit 10 in which a plurality of unit pixels 3 are arranged in a two-dimensional matrix. The solid-state imaging device 1 uses a color separation filter having a Bayer arrangement of color filters of R, G, and B, so the color imaging-compliant pixel array unit 10 can be realized.

In FIG. 1, a part of rows and columns are omitted for simplification, but actually, tens to thousands of unit pixels 3 are disposed in each row or each column. As described below, each unit pixel 3 has a photodiode serving as a photosensitive element (charge generator) which is an example a detector, and an in-pixel amplifier having three or four transistors for charge transfer, reset, amplification, and the like. A pixel signal Vx is output from the unit pixel 3 through a vertical signal line 19 for each column. The pixel signal Vx includes a reset level Srst (P-phase component) and a signal level Ssig (D-phase component).

The solid-state imaging device 1 also has a column AD converter 26 in which AD converters 250 having a CDS (Correlated Double Sampling) processing function or a digital conversion function are arranged in column-parallel. The term "column-parallel" means that a plurality of CDS processing functional portions or digital converters (AD converters) are substantially provided in parallel with respect to the vertical signal line 19 of a vertical column (an example of a column signal line). Such a readout method is called a column readout method.

The solid-state imaging device 1 also includes a driving controller 7, a readout current source unit 24 that supplies an operating current for pixel signal readout (readout current) to the unit pixels 3, a reference signal generator 27 that supplies a reference signal SLP_ADC for AD conversion to the column AD converter 26, and an output unit 28.

The driving controller 7 includes a horizontal scanner 12 (column scanning circuit), a vertical scanner 14 (row scanning circuit), and a communication/timing controller 20 for realizing a control circuit function to sequentially read out the signals of the pixel array unit 10.

The horizontal scanner 12 has a horizontal address setting unit 12a, a horizontal driver 12b, and the like, which control column addresses or column scanning. The vertical scanner 14 has a vertical address setting unit 14a, a vertical driver 14b, and the like, which control row addresses or row scanning. The horizontal scanner 12 or the vertical scanner 14 starts the selection operation (scanning) of rows or columns in response to control signals CN1 and CN2 from the communication/timing controller 20.

The communication/timing controller 20 includes a functional block serving as a timing generator (an example of a readout address control apparatus) which supplies a clock synchronized with a master clock CLK0 input through a terminal 5a to the respective units (the scanners 12 and 14, and the column AD converter 26) in the device. The communication/timing controller 20 also includes a functional block serving as a communication interface which receives the master clock CLK0 supplied from an external main controller through the terminal 5a, receives data indicating an operation mode supplied from the external main controller through the terminal 5b, and outputs data including information regarding the solid-state imaging device 1 to the external main controller.

For example, the communication/timing controller 20 has a clock converter 20a which has a function as a clock converter to generate an internal clock, and a system controller 20b which has a communication function or a function to control the respective units. The clock converter 20a is embedded with a multiplication circuit which generates pulses with higher frequency than the master clock CLK0 input through the terminal 5a, and generates internal clocks, such as a count clock CKcnt1, and a count clock CKdac1.

The output unit 28 has a sense amplifier 28a (S·A) which detects signals (which are digital data but have small amplitude) on the horizontal signal line 18, and an interface unit 28b (I/F unit) which has an interface function with the solid-state imaging device 1. The output of the interface unit 28b is connected to an output terminal 5c, and video data is output to a subsequent-stage circuit. The output unit 28 may be provided with a digital arithmetic unit 29a between the sense amplifier 28a and the interface unit 28b so as to carry out digital arithmetic operations without using various frame memories. A digital arithmetic unit 29b may be provided outside the solid-state imaging device 1 so as to carry out digital arithmetic operations using the frame memories. The reason why a digital arithmetic unit is provided inside or outside the solid-state imaging device 1 depending on presence/absence of the frame memories is that the circuit scale of the frame memories is taken into consideration. If there is a space in the solid-state imaging device 1, the digital arithmetic unit 29a may be configured to carry out the digital arithmetic operations using the frame memories.

In this embodiment, similarly to the scheme described in the JP-A-2007-151069, the digital arithmetic unit 29 (29a or 29b) using the frame memories performs processing in order to achieve high S/N ratio and wide dynamic range on the basis of the pixel signals obtained by the multiple times of intermediate transfer.

Each unit pixel 3 is connected to the vertical scanner 14 through a row control line 15 for row selection, and is connected to the AD converter 250, which is provided for each vertical column of the column AD converter 26, through the vertical signal line 19. The row control line 15 represents the overall wiring from the vertical scanner 14 to the pixel.

As the AD conversion system in the AD converter 250, various systems are considered in terms of circuit scale, processing speed (high speed), or resolution, but an AD conversion method which is called a reference signal comparison type, a slope integration type, or a ramp signal comparison type is used as an example. In the case of reference signal comparison type AD conversion, an effective count operation period is decided on the basis of the time from the start of conversion (start of comparison processing) to the end of conversion (end of comparison processing), and an analog processing-target signal is converted into digital data on the basis of a count enable signal EN representing that period.

For this reason, the reference signal generator 27 has a DA converter 270 (DAC; Digital Analog Converter), and generates the reference signal SLP_ADC having an inclination (change rate) represented by control data CN4 from an initial value represented by control data CN4 from the communication/timing controller 20 in synchronization with the count clock CKdac1. The count clock CKdac1 may be the same count clock CKcnt1 for a counter unit 254.

The AD converter 250 includes a comparator 252 (COMP), and a counter unit 254 which can switch an up-count mode and a down-count mode. In this example, a data storage unit 256 is provided at the back of the counter unit 254. The comparator 252 compares the reference signal SLP_ADC which is generated by the reference signal generator 27 with an analog pixel signal Vx from the unit pixel 3 of the selected row through the vertical signal line 19 (H1, H2, . . . , Hh). The counter unit 254 counts the active period of the count enable signal EN having a predetermined relationship with a comparison output Co of the comparator 252 by using the count clock CKcnt1, and retains the count result.

A control signal CN5 is input from the communication/timing controller 20 to the counter unit 254 of each AD converter 250. The control signal CN5 indicates whether the counter unit 254 carries out a P-phase/D-phase count processing in the down-count mode or the up-count mode, or other kinds of control information, such as setting or reset processing of an initial value Dini in the P-phase count processing.

The reference signal SLP_ADC generated by the reference signal generator 27 is input commonly to one input terminal (+) of the comparator 252 and the input terminals (+) of other comparators 252. The vertical signal line 19 of the corresponding vertical column is connected to the other input terminal (−) of the comparator 252, and the pixel signal Vx from the pixel array unit 10 is input to the other input terminal (−) of the comparator 252.

The count clock CKcnt1 is input commonly to a clock terminal of the counter unit 254 and clock terminals of other counter units 254 from the communication/timing controller 20. When no data storage unit 256 is provided, a control pulse is input to the counter unit 254 from the horizontal scanner 12 through a control line 12c. The counter unit 254 has a latch function to retain the count result, and retains the counter output value until an instruction is made by a control pulse through the control line 12c.

In this embodiment, while the AD converter 250 completes the CDS processing, P-phase data at the reset level Srst and D-phase data at the signal level Ssig may be individually transferred to the output unit 28, and the digital arithmetic unit at the back of the AD converter 250 may perform the CDS processing. The applicant suggests various reference signal comparison-type AD conversion methods in which the AD converter 250 performs AD conversion and CDS processing, and these methods may be basically used in the embodiments.

The solid-state imaging device 1 of this embodiment is structured as a so-called one-chip structure (the elements are provided on the same semiconductor substrate) such that the elements of the driving controller 7, such as the horizontal scanner 12, the vertical scanner 14, and the like are formed integrally in a semiconductor area, such as single-crystal silicon or the like, by using the same technique as the semiconductor integrated circuit manufacturing technique, together with the pixel array unit 10.

The solid-state imaging device 1 may be structured as a one-chip structure such that the units are formed integrally in the semiconductor area, but though not shown, it may be structured in the shape of a packaged module having an imaging function such that optical systems, such as an imaging lens, an optical low pass filter, an infrared light cut filter, and the like are provided, in addition to various signal processors, such as the pixel array unit 10, the driving controller 7, the column AD converter 26, and the like, and are put together.

With regard to the output of each AD converter 250, for example, the output of the counter unit 254 may be connected to the horizontal signal line 18. Alternatively, as shown in the drawing, a structure maybe made such that the data storage unit 256 which serves as a memory device including a latch for retaining the count result retained by the counter unit 254 is provided at the back of the counter unit 254.

The data storage unit 256 retains and stores the count value transferred from the counter unit 254. A control pulse is input to the data storage unit 256 from the horizontal scanner 12 through the control line 12c. The data storage unit 256 retains the count value imported from the counter unit 254 until an instruction is made by a control pulse through the control line 12c.

The horizontal scanner 12 has a function as a readout scanner which reads out the count value retained in each data storage unit 256 when each comparator 252 and each counter unit 254 of the column AD converter 26 perform the relevant processing. The output of the data storage unit 256 is connected to the horizontal signal line 18. The horizontal signal line 18 has a number of signal lines corresponding to the bit width or two times (for example, in the case of complementary output) larger than the bit width of the AD converter 250, and is connected to the output unit 28 which has the sense amplifier 28a corresponding to the relevant output line. The counter unit 254, the data storage unit 256, and the horizontal signal line 18 are structured so as to correspond to n bits.

The solid-state imaging device 1 of this embodiment is driven with two power source systems, a digital power source and an analog power source, as a power source system. On the semiconductor chip on which the solid-state imaging device 1 is formed, power terminals (not shown) for a digital positive voltage DVDD, a digital ground voltage DVSS, an analog positive voltage AVDD, an analog ground voltage AVSS are provided. In particular, similarly to JP-A-2001-189893 and JP-A-2007-151069, this embodiment is structured so as to correspond to a plurality of control voltage levels of driving pulses of the charge transfer unit which transfers the signal charges.

The solid-state imaging device 1 includes a power source unit 300 that generates power source voltages which are supplied to the respective units on the basis of instructions regarding a voltage setting TS from the communication/timing controller 20. The power source unit 300 has a positive power source 302 that boosts the digital positive voltage DVDD or the analog positive voltage AVDD to generate a digital positive voltage DVDDw or an analog positive voltage AVDDw. The solid-state imaging device 1 is structured in a one-chip structure such that, in addition to the elements, such as the driving controller 7, the output unit 28, and the like, the power source unit 300 is formed integrally with the pixel array unit 10 in the semiconductor area, such as single-crystal silicon or the like, by using the same technique as the semiconductor integrated circuit manufacturing technique.

In this embodiment, the positive power source 302 boosts the digital positive voltage DVDD or the analog positive voltage AVDD to generate a different power source voltage value inside the solid-state imaging device 1 (semiconductor chip). According to such a scheme, even though there is only one power source voltage value which is supplied from the outside of the semiconductor chip, a plurality of power source voltages can be generated inside the chip.

While the positive power source 302 is embedded into the solid-state imaging device 1 as an example, the positive power source 302 may be provided separate from the semiconductor area where the pixel array unit 10, the driving controller 7, and the like are formed (see an imaging apparatus 8 described below).

<Interface of Pixel Array Unit and Vertical Scanner>

FIG. 2 is a diagram showing the solid-state imaging device 1 of this embodiment focusing on an interface of the vertical scanner 14 and the pixel array unit 10.

The unit pixel 3 includes, for example, a charge generator 32 and four transistors having different functions (a readout selection transistor 34, a reset transistor 36, a vertical selection transistor 40, and an amplification transistor 42) as basic elements. The readout selection transistor 34 is a switch transistor constituting a transfer unit, and a reset transistor 36 is a switch transistor constituting a reset unit. The readout selection transistor 34, the reset transistor 36, and the amplification transistor 42 constitute a pixel signal generator 5 (signal output unit) together with a floating diffusion 38. The pixel signal generator 5 and the vertical selection transistor 40 constitute a signal output unit 6 which generates and outputs a pixel signal Vx corresponding to the signal charges generated by the charge generator 32. The transistors 34, 36, 40, and 42 are collectively called a pixel transistor.

A gate of the readout selection transistor 34 (transfer transistor/readout transistor) constituting the transfer unit is connected to a transfer wiring 54 together with the relevant gates of the same row, and is driven with a transfer signal TRG. A gate of the reset transistor 36 constituting an initialization unit is connected to a reset wiring 56 together with the relevant gates of the same row, and is driven with a reset signal RST. A gate of the vertical selection transistor 40 (select transistor) is connected to a vertical selection line 58 together with the relevant gates of the same row, and is driven with a vertical selection signal VSEL. The transfer wiring 54, the reset wiring 56, and the vertical selection line 58 are the row control line 15 of the FIG. 1.

With regard to the transfer signal TRG, the reset signal RST, and the vertical selection signal VSEL, generally, a two-value pulse of an active H level (high; power source voltage level) and an inactive L level (low; reference level) is used. It is assumed that the power source voltage level is, for example, at around 3 V. The reference level is, for example, at 0.4 to 0.7 V or at a ground level of 0 V, and as occasion demands, it is assumed that a part of pulses or all pulses are at a negative potential of around −1 V.

The charge generator 32 which is an example of a detector, and includes a photosensitive element DET, such as a photodiode PD or the like, is structured such that one end (anode side) of the photosensitive element DET is connected to a low potential-side reference potential Vss (negative potential: for example, around −1 V), and the other end (cathode side) of the photosensitive element DET is connected to an input terminal (usually, a source) of the readout selection transistor 34. Note that the reference potential Vss may be a ground potential GND. An output terminal (usually, a drain) of the readout selection transistor 34 is connected to a node where the reset transistor 36, the floating diffusion 38, and the amplification transistor 42 are connected to each other. A source of the reset transistor 36 is connected to the floating diffusion 38, and a drain of the reset transistor 36 is connected to a reset power source Vrd (usually, common to an analog pixel power source Vdd).

A drain of the vertical selection transistor 40 is connected to a source of the amplification transistor 42, a source of the vertical selection transistor 40 is connected to a pixel line 51, and a gate (in particular, called a vertical selection gate SELV) of the vertical selection transistor 40 is connected to the vertical selection line 58. The pixel line 51 is connected to the vertical signal line 19 together with the relevant pixel lines 51 of the same column. A gate of the amplification transistor 42 is connected to the floating diffusion 38, a drain of the amplification transistor 42 is connected to the pixel power source Vdd, and a source of the amplification transistor 42 is connected to the pixel line 51 through the vertical selection transistor 40 and to the vertical signal line 19. The invention is not limited to such a connection structure. For example, the vertical selection transistor 40 and the amplification transistor 42 may be reversely arranged. In this case, the drain of the vertical selection transistor 40 is connected to the pixel power source Vdd, and the source of the vertical selection transistor 40 is connected to the drain of the amplification transistor 42. The source of the amplification transistor 42 is connected to the pixel line 51.

One end of the vertical signal line 19 extends toward the column AD converter 26, and the readout current source unit 24 is connected to the extension path of the vertical signal line 19. Although details are omitted, a readout current controller 24 has a load MOS transistor for each vertical column whose gate is connected to the gate of a transistor of a reference current source unit to form a current mirror circuit, and functions as a current source for the vertical signal line 19. Then, a source follower, to which a substantially constant operating current (readout current) is supplied, is formed between the load MOS transistor and the amplification transistor 42.

A positive power terminal of the vertical scanner 14 is supplied with the digital positive voltage DVDDw or the analog positive voltage AVDDw as a power source voltage from the positive power source 302. A reference terminal of the vertical scanner 14 is connected to the reference potential (ground). For example, the vertical address setting unit 14a is formed by a decoder. A positive power terminal of the vertical address setting unit 14a is supplied with the digital positive voltage DVDD1 or the analog positive voltage AVDD1 from the positive power source 302, and a reference terminal of the vertical address setting unit 14a is connected to the reference potential (ground: GND).

The vertical driver 14b has a level shifter 146 (L/S) and a driver 148 for each of the row control lines 15 of each row (the transfer wiring 54, the reset wiring 56, and the vertical selection line 58). Power source terminals of the level shifter 146 and the driver 148 are connected to the positive power source 302 (not shown).

The level shifter 146 is supplied with an input pulse (the transfer pulse TRG, the reset pulse RST, or the vertical selection pulse VSEL) whose high level is the digital positive voltage DVDD1 (or analog positive voltage AVDD1) and whose low level is GND from the vertical address setting unit 14a. The level shifter 146 converts the input pulse into a pulse whose high level is the analog positive voltage AVDDw and whose low level is the analog negative voltage AVSS (may be the ground voltage) and outputs the analog negative voltage AVSS. Each pulse whose voltage level has been converted by the level shifter 146 is supplied to the gate of a corresponding one of the transistors 34, 36, and 42 of the unit pixel 3 through the driver 148, and drives each of the transistors 34, 36, and 42.

In the solid-state imaging device 1 of this embodiment, the vertical driver 14b supplies the voltage to the power terminal of each of the level shifter 146 and the driver 148 as follows. First, a positive power terminal of a level shifter 146_1 for the reset pulse RST is supplied with an analog positive voltage AVDD2_1 from the positive power source 302. A positive power terminal of a level shifter 146_2 for the transfer pulse TRG is supplied with an analog positive voltage AVDD2_2 from the positive power source 302. A positive power terminal of a level shifter 146_3 for the vertical selection pulse VSEL is supplied with an analog positive voltage AVDD2_3 from the positive power source 302.

A positive power terminal of a driver 148_1 for the reset pulse RST is supplied with an analog positive voltage AVDD3_1 from the positive power source 302. A positive power terminal of a driver 148_2 for the transfer pulse TRG is supplied with an analog positive voltage AVDD3_2 from the positive power source 302. A positive power terminal of a driver 148_3 for the vertical selection pulse VSEL is supplied with an analog positive voltage AVDD3_3 from the positive power source 302. Negative power terminals of the level shifter 146 and the driver 148 are all supplied with the analog negative voltage AVSS2 (may be the ground voltage), regardless of the reset pulse RST, the transfer pulse TRG, and the vertical selection pulse VSEL.

The digital positive voltage DVDD1 (or the analog positive voltage AVDD1) for the vertical address setting unit 14a, the analog positive voltages AVDD2_1, AVDD2_2, and AVDD2_3 for the level shifter 146, and the analog positive voltages AVDD3_1, AVDD3_2, and AVDD3_3 for the driver 148 are treated as follows, for example. First, the positive power source for the vertical address setting unit 14a may be digital or analog. In the vertical driver 14b, at least the analog positive voltage AVDD2_2 of the level shifter 146_2 and the analog positive voltage AVDD3_2 of the driver 148_2 for the transfer pulse TRG are set to be independent from other driving pulses, such that the driving pulse level of the transfer pulse TRG can have multiple values. For example, AVDD2_1, AVDD2_3, AVDD3_1, and AVDD3_3 are set to be common, and AVDD2_2 and AVDD3_2 are set to be common. Of course, this is just an example, and the voltages may appropriately vary within the range satisfying the above-described condition. With regard to the voltage levels of AVDD2_1, AVDD2_3, AVDD3_1, and AVDD3_3, and AVDD2_2 and AVDD3_2, at least the H level is set to be the same as the H level of the pixel power source Vdd (=Vrd).

The fact that "the driving pulse level of the transfer pulse TRG have multiple values" means that, in addition to a voltage level (complete transfer level) for the normal complete transfer in which the saturated charge amount of the charge generator 32 can be completely transferred to the pixel signal generator 5 (the floating diffusion 38), at least one voltage (in this example, a voltage at a level lower than the complete transfer level: an intermediate voltage) between a voltage (in this example, L level) which turns off the readout selection transistor 34 serving as a charge transfer unit and the complete transfer level is included. The level to be used is decided depending on the driving timing, but complete transfer is at least performed after intermediate transfer using the intermediate voltage is performed.

The positive power source 302 has an intermediate voltage generator 312. Though not shown, the positive power source 302 also has a functional portion which generates a positive voltage (normal voltage) at the same voltage level as the H level of the pixel power source Vdd in the unit pixel 3. The intermediate voltage generator 312 generates a voltage (intermediate voltage) which is lower than a normal transfer driving voltage level (AVDD2_2, AVDD3_2=H level of Vdd) when the readout selection transistor 34 is driven with the transfer signal TRG. The intermediate voltage generator 312 receives the voltage setting TS from the system controller 20b, and adjusts the intermediate voltage to a voltage level according to the voltage setting TS. The positive power source 302 selects the intermediate voltage which is generated by the intermediate voltage generator 312 on the basis of the voltage setting TS or the normal voltage, and supplies the selected voltage to the level shifter 146_2 and the driver 148_2 of the vertical driver 14b.

This embodiment adopts a scheme in which the gate electrode of the readout selection transistor 34 is sequentially driven with a plurality of transfer pulses TRG having different transfer driving voltage levels, and a pixel signal based on the signal charges which are sequentially transferred is read out. The read pixel signal based on the signal charges is clipped to a prescribed saturation level and added, for example, in the digital arithmetic unit 29, so a linear signal with a high S/N ratio can be acquired at low luminance without narrowing the normal saturation level, and with regard to incident light having a normal saturation level or more, the dynamic range can be expanded while a satisfactory S/N ratio can be realized in a linear region. Despite of the change of external light under various environments, a high-quality with a high S/N ratio can be acquired in a low luminance scene, and an image with a low degree of saturation can be acquired with high quality in a high luminance scene. Further, in the case of a scene with high contrast in which low luminance and high luminance are mixed, the saturation of the high luminance portion can be avoided while the high S/N ratio can be maintained in the low luminance portion.

This embodiment adopts a scheme in which the "intermediate voltage" is set so as to be adjusted for each device or use environment. That is, when the transfer voltage of the signal charges can be arbitrarily varied, a structure is made such that the device itself can adjust the intermediate voltage. This is because, as described below, a certain set value of the intermediate voltage at the time of the intermediate transfer may generate significant noise, and a suitable setting condition for the intermediate voltage differs depending on the device (solid-state imaging device), and is influenced by the environmental conditions (in particular, temperature).

As the scheme for the adjustment of the intermediate voltage, a feedback loop structure in which the voltage value is changed on the basis of the output value of the charge generator 32 is adopted. The output value of the charge generator 32 includes a pixel signal based on the charge amount (saturated charge amount) when the charge generator 32 is saturated, and a pixel signal based on the charge amount which is retained in the charge generator 32 in a state where the transfer driving voltage level of the transfer signal TRG is at the intermediate voltage, that is, the charge amount (intermediate voltage retained charge amount) which is retained in the charge generator 32 after the intermediate transfer. In order to reliably acquire the pixel signal based on the intermediate voltage retained charge amount, this embodiment adopts a scheme in which, after the charge generator 32 is saturated, the intermediate transfer is performed, and then the complete transfer is performed to acquire the pixel signal corresponding to the intermediate voltage retained charge amount. By adopting, for each device, a scheme in which the saturated charge amount and the intermediate voltage retained charge amount are specified, and on the basis of this result, the intermediate voltage is set to a suitable level, the intermediate voltage can be set to approach the theoretical value, without depending on the device or use environment, and it is assured that there is no image quality disturbance.

In order to saturate the charge generator 32, in addition to the principal scheme in which light with high luminance is actually input and photoelectric conversion by the charge generator 32 is used, for example, a first scheme in which a charge generator 32 having a different saturated charge amount is provided in a part of the pixel array unit 10, or a second scheme in which the driving timing is devised to arbitrarily control the charge amount of the charge generator 32 may be adopted. The first scheme is realized by preparing a pixel (charge generator 32) different from the normal pixel (charge generator 32) in a part of the pixel array unit 10. In the second scheme, the term "arbitrarily control" means that a voltage which can saturate the charge generator 32 is supplied to the charge generator 32 at a predetermined timing by using a switch unit. Hereinafter, the schemes of this embodiment will be described sequentially from how the schemes of this embodiment are devised.

<Verification Experiment>

Figure 3A:
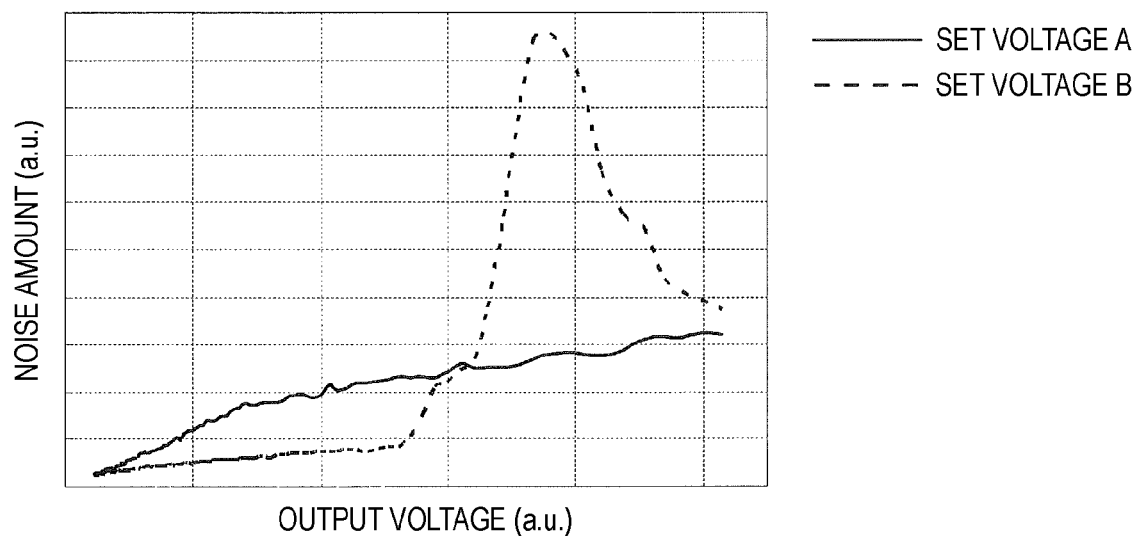
FIG. 3A is a diagram illustrating the relationship between the set value of an intermediate voltage and the amount of noise.
Figure 3B:
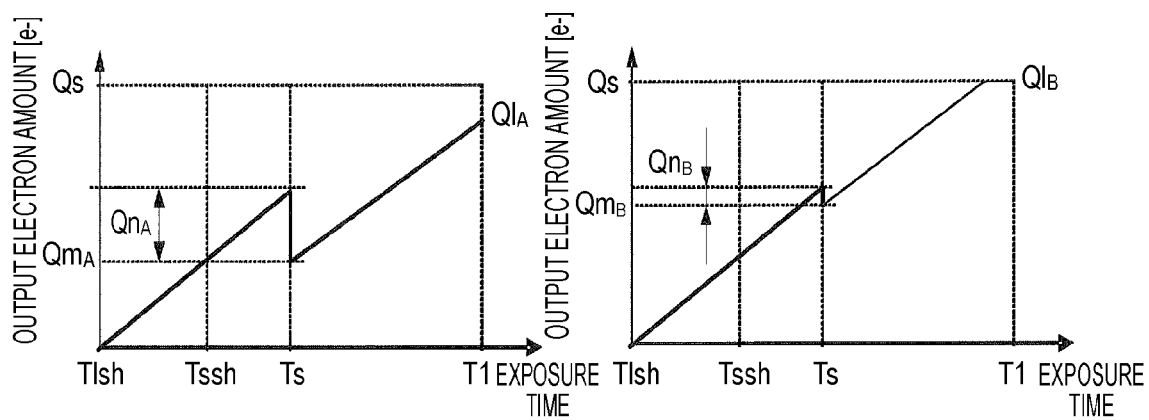
FIG. 3B is a diagram illustrating the driving timing of intermediate transfer and complete transfer of a verification experiment.

FIGS. 3A to 3D are diagrams illustrating a verification experiment in which the relationship between the setting condition for the intermediate voltage and noise has been examined in the scheme in which intermediate transfer is performed. FIG. 3A is a diagram illustrating the relationship between the set value of the intermediate voltage and the noise amount. FIG. 3B is a diagram illustrating the driving timing of intermediate transfer and complete transfer in the verification experiment. FIG. 3C is a diagram illustrating a combined output of signals obtained in the intermediate transfer and the complete transfer on the basis of a plurality of set values of the intermediate voltage. FIG. 3D is a diagram illustrating a difference in the combined output due to a difference in the set value of the intermediate voltage.

[Discovery of Problem]

In the scheme in which intermediate transfer is performed, the transfer pulses TRG having a plurality of transfer driving voltage levels (the voltage level of VDD2_2, AVDD3_2) are sequentially supplied to the gate electrode of the readout selection transistor 34, so intermediate transfer and complete transfer are sequentially performed. This technique sets the transfer driving voltage level (control voltage) of the transfer pulse TRG as follows.

1) The intensity of incident light reaching the number of saturated electrons Qs is supposed with respect to an exposure time as reference.

2) The number of accumulated electrons Ne is estimated at the timing at which the transfer pulse TRG is supplied.

3) The transfer pulse TRG is set to retain the number of accumulated electrons Ne.

4) Actually, a low voltage of several 100 mV is desirably applied.

By using this technique, an experiment on the change of the control voltage level of the transfer pulse TRG was carried out. The outputs obtained in the intermediate transfer and in the complete transfer on the basis of the control voltage were added, and noise was measured. As an example of the experiment, the results which are obtained from two patterns of different control voltage values are shown in FIG. 3A. In FIG. 3A, the horizontal axis represents the pixel signal voltage (output voltage (a.u.)) from the unit pixel 3, and the vertical axis represents the noise amount (a.u.). As shown in FIG. 3A, in the case of a set voltage A, as the output voltage increases, the noise amount tends to gradually increase, but in the case of a set voltage B, specifically, the noise amount significantly increases in a certain output voltage range. Like when the intermediate transfer is performed with the set voltage B, it could be seen that when a certain control voltage value is set, significant noise is generated. The fact that noise differs according to the set voltage is not understood from the descriptions of JP-A-2001-189893 and JP-A-2007-151069.

[Description of Verification Experiment]

FIG. 3B shows the driving timing of intermediate transfer and complete transfer in the verification experiment. The horizontal axis represents the time. A shutter time (charge accumulation time) of the complete transfer is Tlsh, a readout time of the complete transfer is Tl, a shutter time (charge accumulation time) of the intermediate transfer is Tssh, and a readout time of the intermediate transfer is Ts. The vertical axis represents the number of output electrons (charge amount). The number of saturated electrons (saturated charge amount) is Qs, the number of retained electrons by the intermediate transfer (intermediate retained charge amount) is Qm, the number of electrons to be read by the intermediate transfer (intermediate transfer charge amount) is Qn, and the number of electrons to be read by the complete transfer (complete transfer charge amount) is Ql.

The accumulation time ratio Tratio of the intermediate transfer charge amount Qn and the complete transfer charge amount Ql is "Tratio=(Tl−Tlsh)/(Ts−Tssh)", so the complete transfer charge amount Ql and the intermediate transfer charge amount Qn have the relationship "Ql=Tratio×Qn".

[Description of Combination]

At time Tl, the number of output electrons is the complete transfer charge amount Ql, and it is impossible to obtain a value more than the saturated charge amount Qs. In contrast, if the complete transfer charge amount Ql and the intermediate transfer charge amount Qn are combined with each other, an output value equal to or more than the saturated charge amount Qs is obtained. This is a basic method for dynamic range expansion by the use of the intermediate transfer.

It is assumed that data using the complete transfer charge amount Ql and data using the intermediate transfer charge amount Qn are Dm (=Ql+Qn) and Dl (=Qn×Tratio), respectively, and the combined output D is as follows according to the condition.

$$D(Dm \geq Dl) = Dm$$

$$D(Dl < Dm) = Dl$$

With regard to the combined output D, a combined output D_A when the set voltage A is used is shown in (1) in FIG. 3C, a combined output D_B when the set voltage B is used is shown in (2) in FIG. 3C. In the drawings, the horizontal axis represents luminance (a.u.)

[Result of Experiment]

The combined outputs D_A and D_B according to the different control voltages (the set voltages A and B) in the verification experiment are collectively shown in FIG. 3D. As will be understood from FIG. 3D, in the case of the set voltage A, the combined output D_A changes linearly according to the luminance level, but in the case of the set voltage B, there is a region where the combined output D_B changes nonlinearly according to the luminance level. The nonlinear region is generated when information deletion occurs in the complete transfer charge amount Ql of the intermediate transfer charge amount Qn and the complete transfer charge amount Ql to be combined, and the point where the nonlinear region is generated is identical to the noise increase region in the above-described experiment.

[Condition of Information Deletion]

Next, the condition of information deletion of the complete transfer charge amount Ql in the experiment result shown in FIG. 3D is specified. In the experiment shown in FIGS. 3B to 3D, there is a case where at the time Tssh, the intermediate retained charge amount Qm is reached, and at the time Tl, the complete transfer charge amount Ql reaches the saturated charge amount Qs. In this case, the complete transfer charge amount Ql and the intermediate retained charge amount Qm have the relationship "Ql=(Tl−Ts)/(Tssh−Tlsh)×Qm+Qm". If this relationship is maintained in a region where the complete transfer charge amount Ql does not reach the saturated charge amount Qs, it is possible to prevent information deletion of the complete transfer charge amount Ql. For this reason, the intermediate retained charge amount Qm needs to be set to satisfy the condition that there is no information deletion. This condition is "Qm≧(Tssh−Tlsh)/(Tl−Ts+Tssh−Tlsh)×Qs".

[Conclusion]

While taking the above-described result into consideration, it is impractical to set the control voltage value for each device in order that the condition is satisfied with regard to a lot of devices, so it is considered that a margin is left in the setting of the control voltage such that the setting condition is satisfied with regard to all devices. However, the fact that there is the margin in the setting means that adjustment is not assured for each device. Further, even though the use environment temperature or operating voltage of the device is set under a certain condition, the use environment of the device may vary. In such a case, the optimum set value should be assured.

From the above description, it is desirable that a mechanism be provided in each device so as to adjust the transfer driving voltage level of the transfer pulse TRG (in particular, the intermediate voltage level). Next, a specific structure example of such a scheme (intermediate voltage setting adjustment processing) will be described. As described above, as the main structure, a scheme is used in which at the time of readout, the control voltage value is changed according to the device or use environment, and intermediate transfer is performed. In order to realize this scheme, the system controller 20b determines whether or not output data of the charge generator 32 is correct, and controls the power source unit 300 serving as a voltage supply circuit on the basis of the determination result to set the set value of the intermediate voltage in a suitable range with the transfer driving voltage level (control voltage) of the transfer pulse TRG. As a whole, a feedback loop is formed.

<First Embodiment>

The first embodiment adopts a scheme in which a charge generator 32 having a saturated charge amount different from the charge generator 32 of the normal pixel is provided in a part of the pixel array unit 10.

FIGS. 4A and 4B are diagrams illustrating a scheme in which a part of the unit pixel 3 is modified for an intermediate voltage setting adjustment processing of the first embodiment. FIG. 4A is a schematic sectional view illustrating a pixel structure of one pixel. FIG. 4B is a plan view illustrating the structure of the entire pixel array unit 10.

A charge generator 32 which generates the saturated charge amount Qs with a short exposure time is provided in a part of the pixel array unit 10. A scheme in which the accumulated charge amount of the charge generator 32 is arbitrarily controlled by means other than photoelectric conversion is adopted. This scheme can be easily realized, for example, by physical means that, as shown in FIG. 4A, a member (called a charge injection layer 432) ((2) in FIG. 4A) which performs charge injection such that the charge generator 32 is saturated is formed on the charge generator 32 (photodiode PD) in the normal pixel structure ((1) in FIG. 4) when the shape of the unit pixel 3 is generated. A unit pixel 3 where no charge injection layer 432 is formed on the charge generator 32 is called a normal pixel 3a, and a unit pixel 3 where the charge injection layer 432 is formed on the charge generator 32 is called a scratched pixel 3b.

If the charge injection layer 432 is formed on the surface of the charge generator 32, the unit pixel becomes a scratched pixel, and charges are injected from the charge injection layer 432, regardless of exposure. Accordingly, the saturated charge amount Qs is easily reached even in a short exposure time.

As the charge injection layer 432, for example, from the description of the paragraph 9 of JP-A-2008-016723, "A metal silicide layer causes a crystal defect and noise is superimposed on the pixel signal due to a coupling leak current caused by the crystal defect", the metal silicide layer may be positively used. That is, the metal silicide layer as an example of the charge injection layer 432 is disposed on the charge generator 32, so charge injection which has no relation with exposure is realized.

Referring to JP-A-2008-016723, a photodiode 110 corresponding to the charge generator 32 of this embodiment includes, in order from the substrate surface, a P-type impurity region 115 and an N-type impurity region 114. If a metal silicide layer 124 corresponding to the charge injection layer 432 of this embodiment is formed on the N-type impurity region 114, a structure in which a coupling leak current increases due to a crystal defect is formed on the photodiode 110. Note that the P-type impurity region 115 is disposed on the N-type impurity region 114 so as to suppress white scratch due to an interface defect, so the P-type impurity region 115 may not be provided.

The scratched pixel 3b shown in (2) in FIG. 4 is replaced with a portion of the normal pixel 3a and disposed in the pixel array unit 10. As shown in (2) in FIG. 4B, in the pixel array unit 10, in addition to a normal area (normal pixel area 10a) where the normal pixel 3a with no charge injection layer 432 is disposed, an area (scratched pixel area 10b) where the scratched pixel 3b with the charge injection layer 432 on the surface of the charge generator 32 is disposed is provided. The scratched pixel 3b functions as a retained charge measurement pixel, and the scratched pixel area 10b functions as a retained charge measurement area.

The scratched pixel area 10b is disposed, for example, in one row or several rows of an upper or lower portion of the pixel array unit 10 such that there is no adverse affect on normal imaging. The normal pixel area 10a on the central side of the pixel array unit 10 is particularly called an effective imaging area. In (2) in FIG. 4B, the normal pixel area 10a is further provided above the scratched pixel area 10b, but this portion may not be provided.

FIGS. 5A to 5C are diagrams illustrating the pixel driving timing in the first embodiment. FIG. 5A is a diagram illustrating the relationship between an area identification signal Tx for identifying the normal pixel area 10a and the scratched pixel area 10b, and the pixel array unit 10. FIG. 5B is a timing chart illustrating the operation when a pixel signal is read out during a period in which the area identification signal Tx is at an L level. FIG. 5C is a timing chart illustrating the operation when a pixel signal is read out during a period in which the area identification signal Tx is an H level.

As shown in (1) in FIG. 5A, when the first embodiment is not applied, a pixel readout signal Tpr synchronized with a vertical synchronizing signal XVS is used, and the period in which the pixel readout signal Tpr is at an H level becomes a period in which a pixel signal is read out. As shown in (2) in FIG. 5A, in the first embodiment, the area identification signal Tx for identifying the normal pixel area 10a and the scratched pixel area 10b shown in FIG. 4B is used, and when the pixel readout signal Tpr is at the H level, the period in which the area identification signal Tx is at the H level is the readout period of the scratched pixel area 10b, and the period in which the area identification signal Tx is at the L level is the readout period of the normal pixel area 10a.

As shown in FIG. 5B, in the case of a normal readout operation from the normal pixel 3a which is saturated with irradiation of an intensive light quantity, the vertical selection signal VSEL of the readout row is set at the active H level, and the reset signal RST is set at the active H level to turn on the reset transistor 36, so the floating diffusion 38 is reset to the power source potential AVDD2_2 (=AVDD3_2). Thereafter, the transfer signal TRG is set at the active H level to turn on the readout selection transistor 34, so the signal charges of the charge generator 32 are transferred to the floating diffusion 38. Accordingly, the voltage of the floating diffusion 38 decreases in accordance with to the amount of the signal charges, and a voltage corresponding to the amount of the signal charges is transmitted as a pixel signal from the pixel signal generator 5 to the AD converter 250 through the vertical signal line 19. This example shows the charges of the normal pixel 3a which are saturated at the time of readout when an intensive light quantity is irradiated. The readout electron amount becomes the saturated charge amount Qs.

Next, the vertical selection signal VSEL is set at the inactive L level, and the reset signal RST and the transfer signal TRG are set at the active H level, so the charge generator 32 or the floating diffusion 38 is reset. Thereafter, the signal charges are accumulated in the charge generator 32 in accordance with the light quantity.

As shown in FIG. 5C, during the period in which the area identification signal Tx is at the H level, the following driving is carried out in order to adjust the intermediate voltage level of the transfer pulse TRG. During the period in which the area identification signal Tx is at the H level, a pixel signal is read out from the scratched pixel 3b of the scratched pixel area 10b, and saturation is reached within a short accumulation time. For this reason, at the time of readout, the charge generator 32 constantly reaches the saturated charge amount Qs.

Basically, driving is made in the same manner as during the period in which the area identification signal Tx is at the L level, but there is a difference in that during an intermediate transfer period Tm before the reset signal RST is set at the active H level, the transfer driving voltage level of the transfer pulse TRG is set to the intermediate voltage once in a state where the vertical selection signal VSEL is set at the inactive L level, so charge transfer from the charge generator 32 to the floating diffusion 38 is performed. With this intermediate transfer, excess charges which exceed the intermediate retained charge amount of the scratched pixel 3b according to the intermediate voltage are transferred from the charge generator 32 to the floating diffusion 38. Accordingly, the potential of the floating diffusion 38 decreases.

After the intermediate transfer, the vertical selection signal VSEL is set at the active H level, so a voltage corresponding to the excess charges exceeding the intermediate retained charge amount is transmitted as a pixel signal from the pixel signal generator 5 to the AD converter 250 through the vertical signal line 19. This signal level is not actually used.

Next, the reset signal RST is set at the active H level to turn on the reset transistor 36, so the floating diffusion 38 is reset to the power source potential AVDD2_2 (=AVDD3_2). Thereafter, the transfer signal TRG is set at the active H level (normal voltage) to turn on the readout selection transistor 34, so the signal charges of the charge generator 32 are transferred to the floating diffusion 38. That is, the electrons which remain in the charge generator 32 are readout by the complete transfer. Accordingly, the voltage of the floating diffusion 38 decreases in accordance with the intermediate retained charge amount corresponding to the set intermediate voltage, and a voltage according to the intermediate retained charge amount is transmitted as a pixel signal from the pixel signal generator 5 to the AD converter 250 through the vertical signal line 19.

Figure 5D:
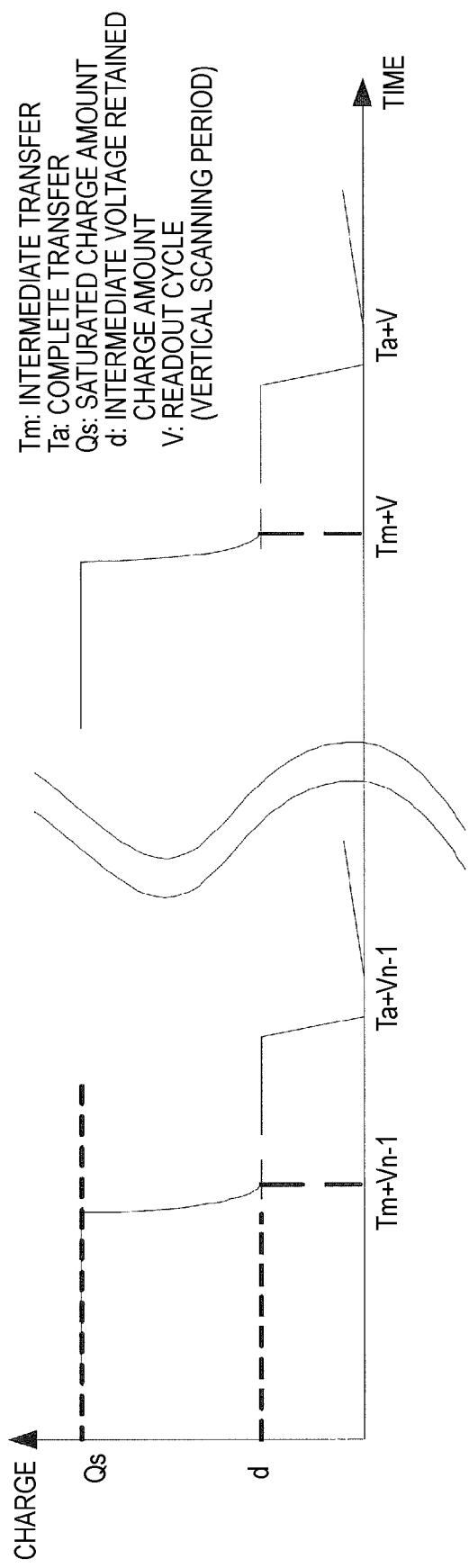
FIG. 5D is a diagram illustrating the transition of a charge amount of a charge generator in a scratched pixel at a vertical scanning rate according to the first embodiment.

FIG. 5D is a diagram illustrating the transition of a charge amount of the charge generator 32 in the scratched pixel 3b at a vertical scanning rate according to the first embodiment. As shown in FIG. 5D, let the readout cycle of the pixel signal from the same scratched pixel 3b be 1V (1 vertical scanning period), then, after 1V, the accumulated charge amount of the charge generator 32 becomes the saturation level (saturated charge amount Qs) again.

FIG. 6 is a diagram showing a structure example of a feedback loop for the adjustment of the transfer driving voltage level (in particular, the intermediate voltage level) of the transfer pulse TRG for each device in this embodiment (not limited to the first embodiment). In the solid-state imaging device 1 of the first embodiment, the positive power source 302 has an intermediate voltage generator 312 that generates, as the transfer driving voltage level of the transfer signal TRG, an intermediate voltage for intermediate transfer different from a normal voltage level for complete transfer.

When focusing on the transfer driving voltage level for the transfer signal TRG over the entire positive power source 302, in addition to a low level (ground level: L level) which turns off the readout selection transistor 34, a high level (H level) for complete transfer which is the voltage level of Vdd serving as the pixel power source and is used for normal transfer, an intermediate voltage between the L level and the H level is generated. Then, the voltage level of AVDD2_2=AVDD3_2 is selected and supplied to the positive power terminals of the level shifter 146_2 and the driver 148_2 for the transfer pulse TRG of the vertical driver 14b in accordance with the driving timing under the control of the system controller 20b.

The intermediate voltage which is generated by the intermediate voltage generator 312 is a voltage which is used to retain a part of charges accumulated in the charge generator 32 and to partially transfer the remaining accumulated charges to the floating diffusion 38. In particular, this embodiment has a scheme in which the level of the intermediate voltage is adjusted for each device. The system controller 20b and the digital arithmetic unit 29a form a pixel driving voltage adjustment apparatus 9 that performs an intermediate voltage setting adjustment processing (pixel driving voltage adjustment processing).

The digital arithmetic unit 29a acquires data D{x,y} of the retained charge amount d{x,y} by the number {x,y} of scratched pixels 3b in the scratched pixel area 10b. Then, an average value Dave, a maximum value Dmax, a minimum value Dmin, and the like (or at least one) are calculated on the basis of data D{x,y}. The digital arithmetic unit 29a notifies the system controller 20b of calculated information.

The system controller 20b has a determination unit 320 that determines whether or not data D{x,y} obtained from each scratched pixel 3b is correct. The determination unit 320 determines whether or not calculated data D, such as the average value Dave, the maximum value Dmax, the minimum value Dmin, and the like calculated by the digital arithmetic unit 29a, satisfies the above-described theoretical expression of the intermediate retained charge amount Qm.

"$Qm \geq (Tssh-Tlsh)/(Tl-Ts+Tssh-Tlsh) \times Qs$"

The system controller 20b performs feedback control of the intermediate voltage generator 312 on the basis of the determination result of the determination unit 320 such that the intermediate voltage becomes the expectation value of the intermediate retained charge amount Qm. For example, when the average value Dave is used as a comparison target, in the case of "Dave>Qm", the system controller 20b controls the intermediate voltage generator 312 to decrease the intermediate voltage. Otherwise, the system controller 20b controls the intermediate voltage generator 312 to increase the intermediate voltage. Note that determination may be made by a value with a predetermined width of intermediate retained charge amount Qm, or the maximum value Dmax or the minimum value Dmin may be used as a comparison target. With the repetition of such an operation, the intermediate voltage which becomes the expectation value of the intermediate retained charge amount Qm can be set.

The scheme of the first embodiment described above may be similarly applied other pixel circuit structures, such as a unit pixel 3 having a 3-TR structure described below and the like.

<Second Embodiment>

An intermediate voltage setting adjustment processing of the second embodiment adopts a scheme in which the driving timing is devised to arbitrarily control the charge amount of the charge generator 32. The driving timing also depends on the circuit structure of the unit pixel 3, but basically, it is realized by supplying a voltage, which can saturate the charge generator 32, to the charge generator 32 at a predetermined timing by using a switch unit. A switch transistor (semiconductor device) is turned on at a predetermined timing, so charge injection is performed such that the charge generator 32 is saturated.

For example, the potential of the floating diffusion 38 is changed, and the potential is notified to the charge generator 32, so the charge amount of the charge generator 32 is adjusted (specifically, forcibly saturated). For this reason, in a state where the pixel power source Vdd is set at the L level, the driving signals of the readout selection transistor 34 and the reset transistor 36 are set at the active level. The L level of the pixel power source Vdd is notified to the charge generator 32 through the reset transistor 36 and the readout selection transistor 34, so the charge generator 32 is filled with electrons and saturated. Thereafter, a data processing or a determination processing is performed in the same manner as the first embodiment, thereby setting the intermediate voltage which becomes the expectation value of the intermediate retained charge amount Qm.

FIRST EXAMPLE

FIGS. 7A to 7D are diagrams illustrating the second embodiment (second example) of the scheme for adjustment of the intermediate voltage. FIG. 7A is a diagram showing a unit pixel 3 having a 3-TR structure to which the second embodiment (second example) is applied. FIG. 7B is a timing chart illustrating the normal driving timing of the unit pixel 3 having the 3-TR structure shown in FIG. 7A. FIG. 7C is a diagram illustrating the relationship between an area identification signal for identifying a normal pixel area and a retained charge measurement area which are applied to the second embodiment (first example), and a pixel array unit. FIG. 7D is a timing chart illustrating the driving timing of the unit pixel 3 having the 3-TR structure shown in FIG. 7A according to the second embodiment (first example).

In the 3-TR structure, the vertical selection transistor 40 in the 4-TR structure is removed. The 3-TR structure is considered to have a feature in that the occupying area of the transistors in the unit pixel 3 is reduced, thereby reducing the pixel size, as compared with the 4-TR structure. In (1) and (2) in FIG. 7A, the charge generator 32 (photoelectric conversion element) and three transistors form the unit pixel 3.

In (1) and (2) in FIG. 7A, the gate of the amplification transistor 42 and the source of the reset transistor 36 are connected to the charge generator 32 through the readout selection transistor 34. The source of the amplification transistor 42 is connected to the vertical signal line 19. The readout selection transistor 34 is driven with the transfer signal TRG through the transfer wiring 54. The reset transistor 36 is driven with the reset signal RST through the reset wiring 56.

In the structure example of (1) in FIG. 7, the drain of the reset transistor 36 and the drain of the amplification transistor 42 are connected to independent wirings, so the drain of the reset transistor 36 is connected to a drain line 57, and the drain of the amplification transistor 42 is supplied with the pixel power source Vdd. In this case, only the drain of the reset transistor 36 is driven between a high level voltage and a low level voltage of the reset power source Vrd (usually, it may the same as the pixel power source Vdd) through the drain line 57.

Meanwhile, in the structure example of (2) in FIG. 7A, the drain of the reset transistor 36 and the drain of the amplification transistor 42 are connected to commonly to the drain line 57. In this case, each drain is driven between the high level voltage and the low level voltage of the pixel power source Vdd through the drain line 57.

In the unit pixel 3 having the 3-TR structure, similarly to the 4-TR structure, the floating diffusion 38 is connected to the gate of the amplification transistor 42, so the amplification transistor 42 outputs a signal corresponding to the potential of the floating diffusion 38 to the vertical signal line 19. The transfer wiring 54 or the reset wiring 56 extends in the row direction. Meanwhile, the drain line 57 may be formed so as to be distinguished for each row, but in many cases, the drain line 57 is actually formed so as to be common to all rows. In the case of driving of this embodiment, basically, the drain line 57 may be formed so as to be common to all rows.

In the unit pixel 3 of the 3-TR structure, like the 4-TR structure, multiple pixels are connected to the vertical signal line 19, but pixel selection is carried out under control of the FD potential, not by the vertical selection transistor 40. Usually, the FD potential is set at the low level. When a pixel is selected, the FD potential of the selected pixel is set at the high level, and the signal of the selected pixel is output to the vertical signal line 19. Thereafter, the FD potential of the selected pixel returns to the low level. This operation is carried out at the same time for the pixels of one row. That is, it can be considered that the structure in which the gate level of the amplification transistor 42 is set at the low level is substituted for the vertical selection transistor 40.

As described above, in order to control the FD potential, the operation that 1) when the FD potential of the selected row is set at the high level, the drain line 57 is set at the high level to set the FD potential at the high level through the reset transistor 36 of the selected row, and 2) when the FD potential of the selected row returns to the low level, the drain line 57 is set at the low level to set the FD potential at the low level through the reset transistor 36 of the selected row is performed.

That is, as shown in FIG. 7B, at the time T0, the pixel power source Vdd of the drain line 57 is changed from the L level to the H level. At the time T1, the reset signal RST becomes the active H level, and the reset transistor 36 is turned on, so the FD potential is reset to the H level. The FD potential is reset to the H level, so a pixel is selected, and other pixels are not selected. Therefore, in the 3-TR structure with no vertical selection transistor 40, pixel selection is possible.

Next, at the time T2, if the transfer signal TRG becomes the active H level, the signal charges which are accumulated in the charge generator 32 are transferred to the floating diffusion 38. At the time T3, the reset signal RST and the transfer signal TRG are both set at the active H level, so the charge generator 32 and the floating diffusion 38 are reset to the high level. At the time T4, the transfer signal TRG is set at the inactive level, and the pixel power source Vdd is changed from the H level to the L level. The charge generator 32 starts to accumulate the charges in accordance with light. At the time T5, the reset signal RST is set at the inactive L level. During the period from T4 to T5, switching from selection to non-selection is carried out. Until the time T5 at which the reset signal RST is set at the inactive L level, the pixel power source Vdd is at the L level, and the reset signal RST is at the active H level, so the FD potential becomes the L level.

With the driving timing of the second embodiment (first example), as the scheme for the saturation of the charge generator 32, the readout selection transistor 34 and the reset transistor 36 are used as a switch unit, and a voltage which can saturate the charge generator 32 is supplied to the charge generator 32 at a predetermined timing.

As shown in FIG. 7C, like the scratched pixels 3b of the first embodiment, it is assumed that the target unit pixels 3 (in particular, called retained charge measurement pixels 3c) are pixels in one or several rows of the upper or lower portion of the pixel array unit 10. An area in the pixel array unit 10 where the retained charge measurement pixels 3c are disposed is called a retained charge measurement area 10c. In the second embodiment (first example), an area identification signal Ty for identifying the normal pixel area 10a and the retained charge measurement area 10c is used, and when the pixel readout signal Tpr is at the H level, the period in which the area identification signal Ty is at the H level is the readout period of the retained charge measurement area 10c, and the period in which the area identification signal Ty is at the L level is the readout period of the normal pixel area 10a.

As shown in FIG. 7D, the period from T0' to T3' is the same as the period from T0 to T3 shown in FIG. 7B. There is a difference in that at the time T3', when the reset signal RST and the transfer signal TRG are both set at the active H level, the pixel voltage is changed from the H level to the L level. Up to the time T4' before the time T5' at which the reset signal RST is set at the inactive L level, the transfer signal TRG is set at the active H level, so the charge generator 32 is preset at the L level and filled with electrons are (saturation state). This is called a backfilling processing of the signal charge generator 32 (PD backfilling).

Next, the transfer signal TRG is set at the inactive L level, and up to the time T5', the floating diffusion 38 is at the low level. This is called a backfilling processing of the floating diffusion 38 (FD backfilling). At the time T6' after such processing, the pixel voltage is changed from the L level to the H level.

Then, the intermediate transfer is performed during a next vertical scanning period after such processing for saturating the charge generator 32 is performed. In this case, first, during the period from T7' to T8', the reset signal RST is set at the active H level to reset the floating diffusion 38 to the high level (FD reset). Thereafter, during the intermediate transfer period Tm, the transfer driving voltage level of the transfer pulse TRG is set to the intermediate voltage once, so charge transfer from the charge generator 32 to the floating diffusion 38 is performed. With the intermediate transfer, excess charges exceeding the intermediate retained charge amount according to the intermediate voltage are transferred from the charge generator 32 to the floating diffusion 38.

After the intermediate transfer, the reset signal RST is set at the active H level (T1'). Thereafter, the transfer signal TRG is set at the active H level to turn on the readout selection transistor 34, so the signal charges of the charge generator 32 are transferred to the floating diffusion 38 (T2'). That is, the electrons which remain in the charge generator 32 are read out by the complete transfer. Therefore, the voltage of the floating diffusion 38 decreases in accordance with the intermediate retained charge amount corresponding to the set intermediate voltage, and a voltage according to the intermediate retained charge amount is transmitted as a pixel signal from the pixel signal generator 5 to the AD converter 250 through the vertical signal line 19.

Such an operation is carried out for multiple pixels (multiple rows), similarly to the first embodiment in which information regarding the voltage according to the intermediate retained charge amount is acquired from the scratched pixel area 10b (scratched pixel 3b), data D{x,y} of the retained charge amount d{x,y} of each of multiple pixels is acquired. Thereafter, similarly to the first embodiment, calculation of calculated data D, and the determination processing based on the theoretical expression of the intermediate retained charge amount Qm are performed, thereby setting the intermediate voltage which becomes the expectation value of the intermediate retained charge amount Qm.

SECOND EXAMPLE

Figure 8A:
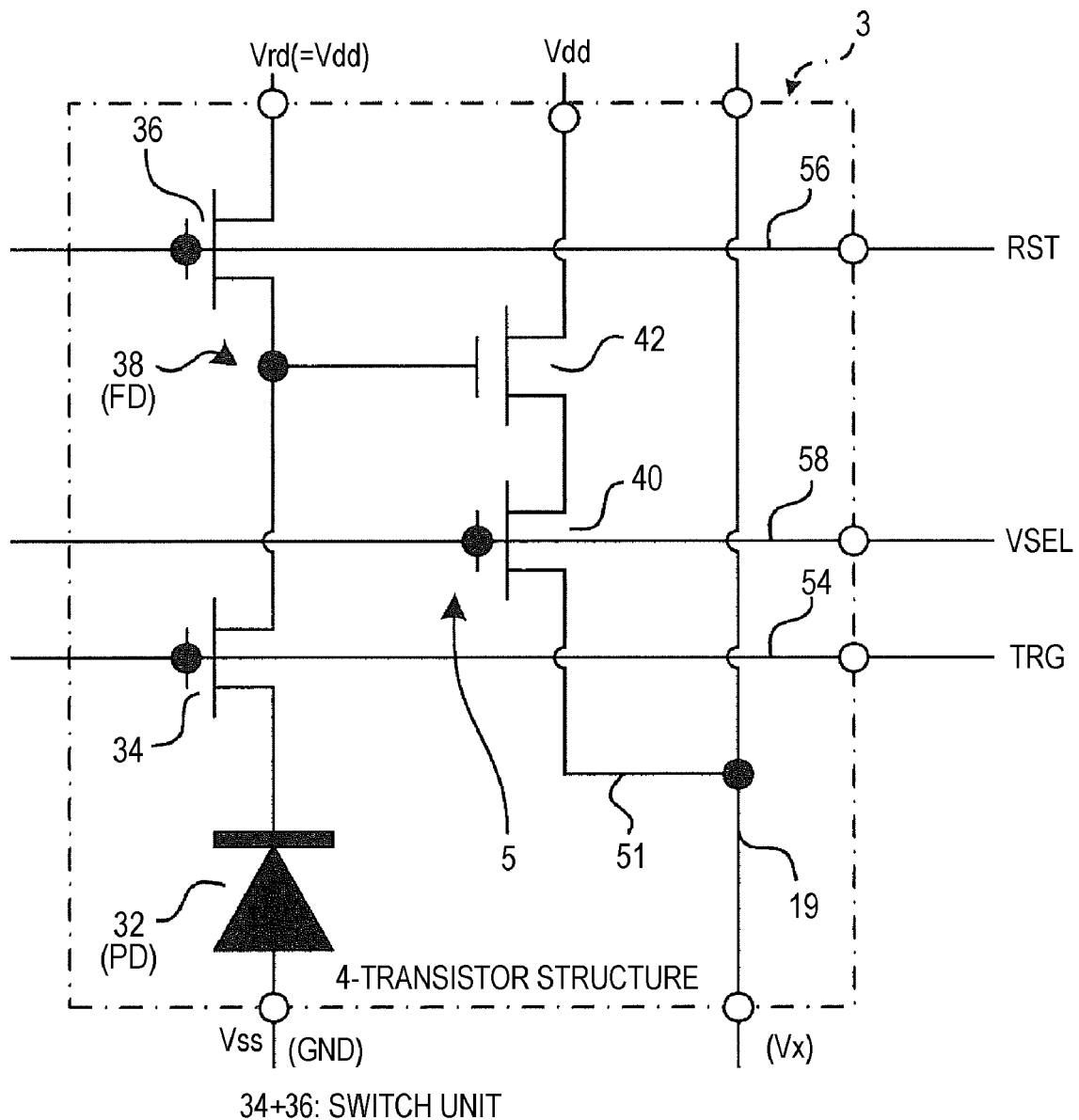
FIG. 8A is a diagram showing a unit pixel having a 4-TR structure to which a second embodiment (second example) is applied.
Figure 8D:
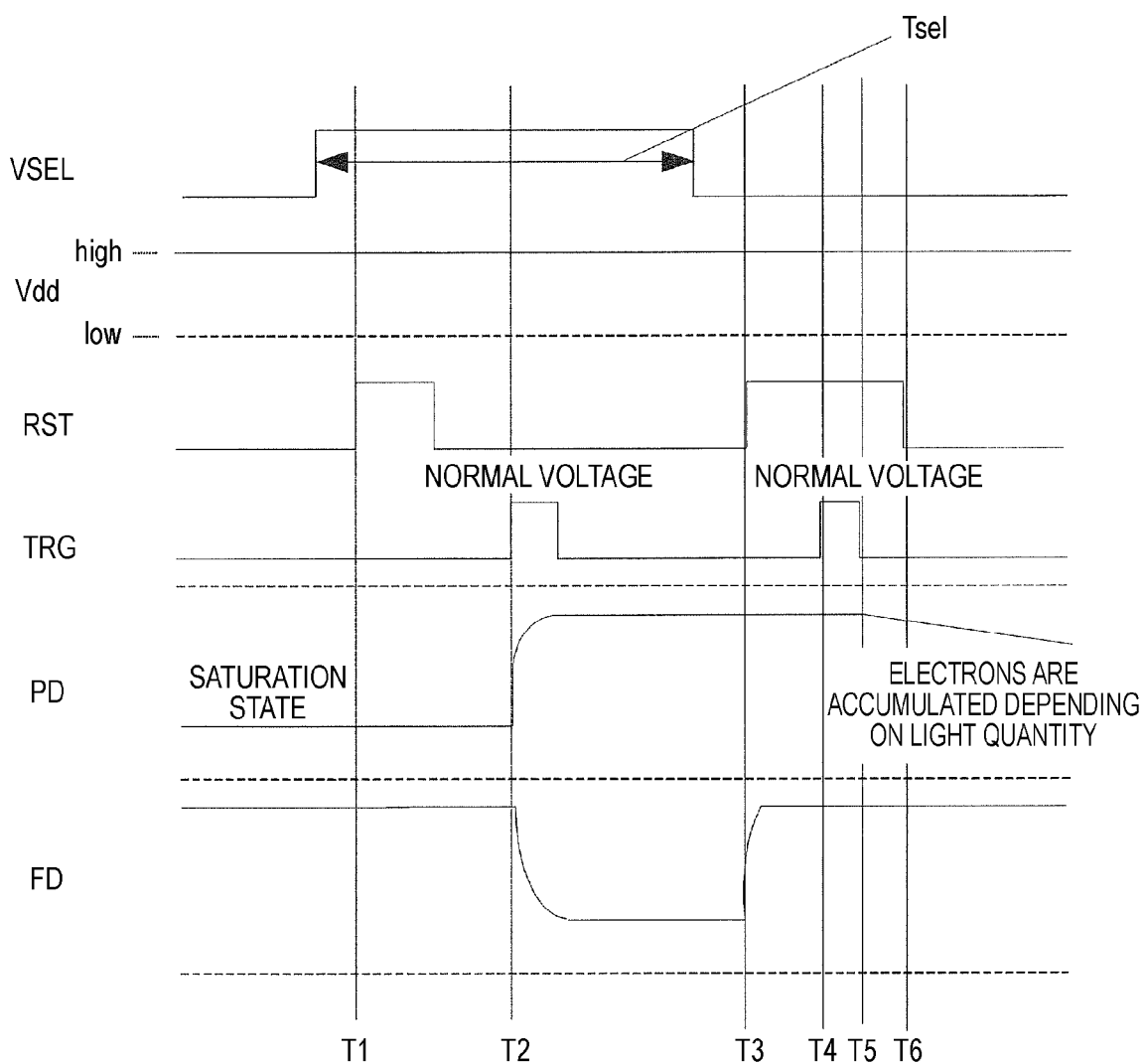
FIG. 8D is a timing chart illustrating the normal driving timing of the unit pixel having the 4-TR structure shown in FIG. 8A.
Figure 8E:
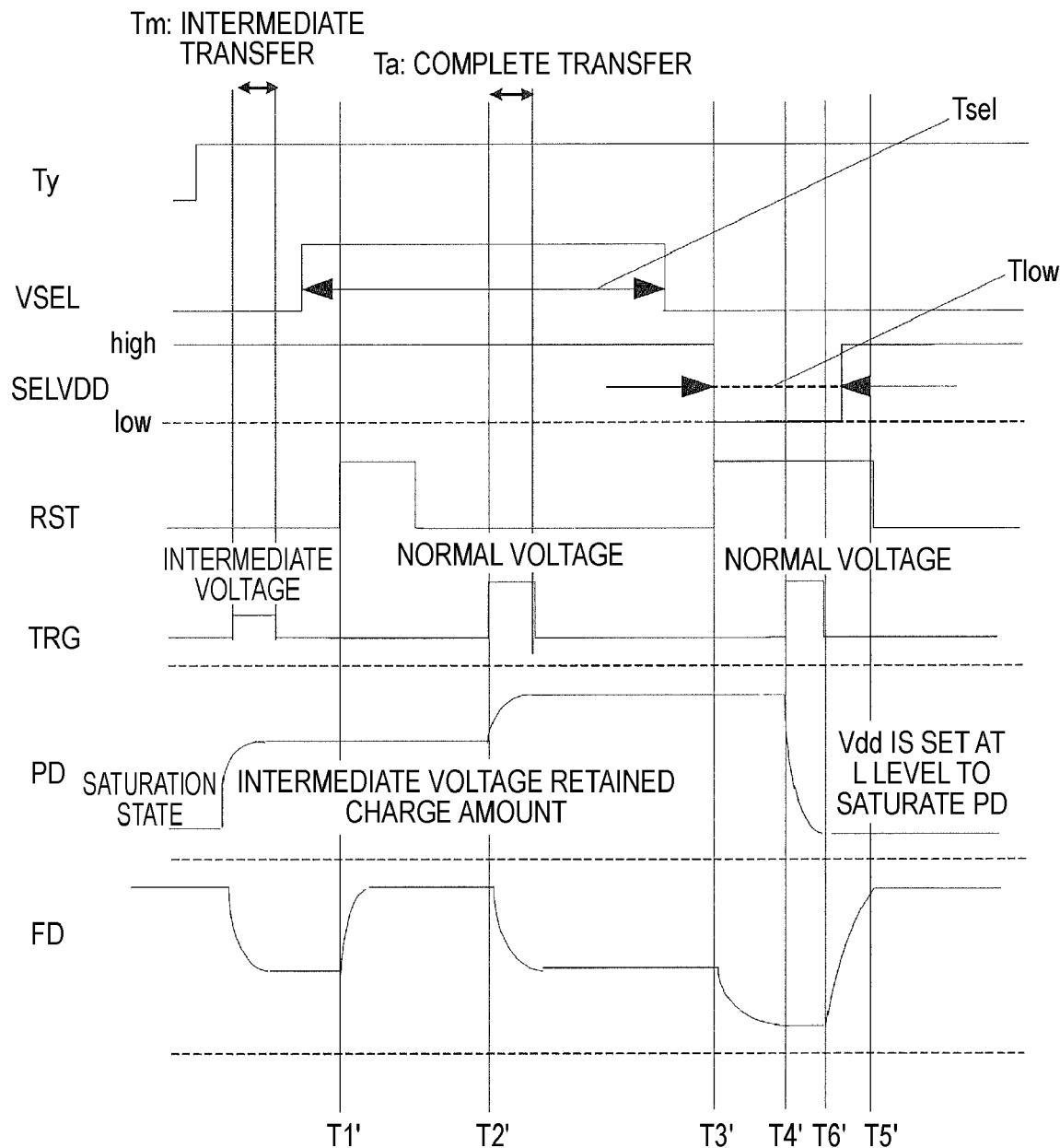
FIG. 8E is a timing chart illustrating the driving timing of the second embodiment (second example) with regard to the unit pixel having the 4-TR structure shown in FIG. 8A.

FIGS. 8A to 8E are diagrams illustrating the second embodiment (second example) of the scheme for the adjustment of the intermediate voltage. FIG. 8A is a diagram showing a unit pixel 3 having a 4-TR structure to which the second embodiment (second example) is applied. The structure of the unit pixel 3 shown in FIG. 8A is the same as the structure of the unit pixel 3 shown in FIG. 2. FIG. 8B is a diagram showing a structure example of a power source unit 300 which is applied to the second embodiment (second example). FIG. 8C is a diagram illustrating the relationship between the area identification signal Ty for identifying the normal pixel area 10a and the retained charge measurement area 10c which are applied to the second embodiment (second example), the pixel array unit 10, and the pixel power sources Vdd and SELVDD. FIG. 8D is a timing chart illustrating the normal driving timing of the unit pixel 3 having the 4-TR structure shown in FIG. 8A. FIG. 8E is a timing chart illustrating the driving timing of the unit pixel 3 having the 4-TR structure shown in FIG. 8A according to the second embodiment (second example).

As will be understood from FIG. 2 or the description of the first embodiment, in the case of the 4-TR structure, the pixel power source Vdd is constantly at the H level, and selection of a readout row is controlled by the vertical selection signal VSEL. As shown in FIG. 8D, the vertical selection signal VSEL may rise before the time T0 and may fall after the transfer signal TRG is set at the active H level and charge transfer is performed. In FIG. 8D, the Tsel period is at the H level. The period from the time T1 to the time T5 is the same as the driving in the 3-TR structure.

With the driving timing of the second embodiment (second example), as the scheme for the saturation of the charge generator 32, similarly to the second embodiment (first example), the readout selection transistor 34 and the reset transistor 36 are used as a switch unit, and a voltage which can saturate the charge generator 32 is supplied to the charge generator 32 at a predetermined timing. In this method, similarly to the second embodiment (first example), the readout selection transistor 34 and the reset transistor 36 are used as a switch unit, and a voltage which can saturate the charge generator 32 is supplied to the charge generator 32 at a predetermined timing. The L level of the pixel power source Vdd is forcibly supplied to the charge generator 32, so the charge generator 32 is preset to the L level and put in the saturation state.

In the case of the 4-TR structure, unlike the 3-TR structure, the pixel power source Vdd is constantly set at the H level at the normal driving timing while the pixel power source Vdd is not set at the L level. In the second embodiment (second example), therefore, as shown in (1) in FIG. 8B, first, the power source unit 300 is structured so as to change the pixel power source Vdd between the H level and the L level. For example, an inverter-type power source buffer 330 which is formed by a cascade circuit of a PMOS 332 and an NMOS 334 is provided. The PMOS 332 is disposed on the pixel power source Vdd side, and the NMOS 334 is disposed on the ground (GND) side. The gates of the PMOS 332 and the NMOS 334 are connected in common and supplied with a power source control signal PSELVDD from the system controller 20b. If it is assumed that the on resistance of each of the PMOS 332 and the NMOS 334 is zero, as shown in (2) in FIG. 8B, the power source buffer 330 sets the pixel power source SELVDD at the L level (=ground potential) when the power source control signal PSELVDD is at the H level, and sets the pixel power source SELVDD at the H level (=pixel power source Vdd) when the power source control signal PSELVDD is at the L level. As shown in FIG. 8C, the pixel power source SELVDD is supplied to the retained charge measurement pixel 3c of the retained charge measurement area 10c, and the normal pixel power source Vdd with no change of L/H is supplied to the normal pixel 3a of the normal pixel area 10a.

For example, as shown in FIG. 8E, like FIG. 7D which shows the driving timing in the 3-TR structure, after the charge generator 32 is forcibly saturated, during the intermediate transfer period Tm, charge transfer from the charge generator to the floating diffusion 38 is performed with the intermediate voltage. During the period (T3' to T5') in which the reset signal RST is set at the active H level, the pixel power source Vdd of the drain line 57 falls to the L level.

In FIG. 8E, the pixel power source Vdd returns to the H level between the time T6' at which the transfer signal TRG is set at the inactive L level and the time T5' at which the reset signal RST is set at the inactive L level (let the period in which the pixel power source Vdd is at the L level be Tlow). When the pixel power source Vdd is at the L level, during the period from T4' to T6', the transfer signal TRG is set at the active H level, so the charge generator 32 is preset to the L level and filled with electrons (the saturation state). Similarly to the first example, this is called a backfilling processing of the signal charge generator 32 (PD backfilling). After the pixel power source Vdd is set at the H level, the reset signal RST is set at the inactive L level, so the floating diffusion 38 can be preset to the high level.

Then, the intermediate transfer is performed during a next vertical scanning period after such processing for saturating the charge generator 32 is performed. In this case, similarly to the first embodiment, before the reset signal RST becomes the active H level, during the intermediate transfer period Tm, the transfer driving voltage level of the transfer pulse TRG is set to the intermediate voltage in a state where the vertical selection signal VSEL is set at the inactive L level, so charge transfer from the charge generator 32 to the floating diffusion 38 is performed. Thereafter, the vertical selection signal VSEL is set at the active H level, and the reset signal RST is set at the active H level to reset the floating diffusion 38 (T1'). Next, the transfer signal TRG is set at the active H level to turn on the readout selection transistor 34, so the signal charges of the charge generator are transferred to the floating diffusion 38 (T2'). Therefore, the voltage of the floating diffusion 38 decreases in accordance with the intermediate retained charge amount corresponding to the set intermediate voltage, and a voltage according to the intermediate retained charge amount is transmitted as a pixel signal from the pixel signal generator 5 to the AD converter 250 through the vertical signal line 19. Hereinafter, the same is applied to the second embodiment (first example).

With regard to the first example of the general 3-TR structure and the second example of the general 4-TR structure, the description has been made regarding the scheme in which the readout selection transistor 34 and the reset transistor 36 are used as a switch unit, and the voltage which can saturate the charge generator 32 is supplied to the charge generator 32 at a predetermined timing, but various circuit structures of the unit pixel 3 are considered. These structures may also adopt a scheme in which, according to the circuit structure, some transistors are used as switch transistor of a switch unit or switch transistors which function as a switch unit are added, and the switch transistors are turned on at a predetermined timing to supply a voltage which can saturate the charge generator 32 to the charge generator 32.

For example, though not shown, a structure may be considered in which a discharge transistor for directly discharging the charges accumulated in the charge generator 32 is provided between the cathode of the charge generator 32 (the readout selection transistor 34 side) and the power line on the drain side of the reset transistor 36 (usually, it may be shared with the pixel power source Vdd). Such a unit pixel 3 may adopt a scheme in which the discharge transistor is used as the switch unit of this embodiment, and a voltage which can saturate the charge generator 32 is supplied to the charge generator 32 through the discharge transistor at a predetermined timing. Of course, the operation principle of the second embodiment is not intended to deny that a switch transistor is provided separate from the discharge transistor.

As described above, according to the scheme of this embodiment, the intermediate voltage which becomes the expectation value of the intermediate retained charge amount Qm can be appropriately set. As will be understood from the above description, the solid-state imaging device 1 which carries out the intermediate voltage setting adjustment processing of the first or second embodiment is structured such that the pixel driving voltage adjustment apparatus 9 which carries out the intermediate voltage setting adjustment processing (pixel driving voltage adjustment processing) is provided therein, and the intermediate voltage can be self-adjusted to a suitable level. The digital arithmetic unit 29*a* has a function as a signal processor which calculates an index value for determination, which is used to set the level of the intermediate voltage to a suitable value, on the basis of the pixel signal based on the saturated charge amount and the pixel signal based on the intermediate voltage retained charge amount, and notifies the calculated index value. The system controller 20*b* has a function as a transfer driving voltage setting unit which compares the index value notified from the digital arithmetic unit 29*a* (signal processor) with the expectation value of the intermediate voltage retained charge amount, and sets the level of the intermediate voltage on the basis of the relevant comparison result.

In the above description, calculated data D, such as the average value Dave, the maximum value Dmax, the minimum value Dmin, and the like are calculated by the digital arithmetic unit 29*a*, but this calculation may be carried out by the digital arithmetic unit 29*b* outside the solid-state imaging device 1. The digital arithmetic unit 29*b* has a function as a signal processor which calculates an index value for determination, which is used to set the level of the intermediate voltage to a suitable value, on the basis of the pixel signal based on the saturated charge amount and the pixel signal based on the intermediate voltage retained charge amount. The digital arithmetic unit 29*b* notifies obtained calculated data D with the system controller 20*b*.

In the case of the solid-state imaging device 1 which carries out the pixel readout operation with the intermediate voltage, there is theoretically a setting, which causes image quality disturbance, in the intermediate voltage, so let the difference between the theoretical value and the voltage to be used be a voltage margin, the voltage margin varies for each sample and is influenced by the environmental conditions.

In contrast, if the scheme of this embodiment is adopted, the set value of the intermediate voltage can approach the theoretical value for each device, so it is possible to assure that there is no image quality disturbance in any device or any use environment.

In addition, the following problems which are generated when this embodiment is not applied can be improved.

1) When the voltage setting is not changed for each device, it is necessary to manage the variation of the voltage margin, and when the characteristic variation is changed due to the change in the production condition, yield is deteriorated. In this example, yield deterioration does not occur, and costs can be reduced by that much.

2) When the voltage setting is changed for each device, it is necessary to measure the relationship between the intermediate voltage and the retained amount for each device, and there is a need for a system which reflects the measurement result in each device. In this example, the device itself has a feedback loop structure which sets a suitable intermediate voltage, and costs can be reduced by costs for the system.

In comparison of the first embodiment and the second embodiment, the following relative merits are considered.

1) In the first embodiment, it is not necessary to add the circuit of an external power source control device, but it is disadvantageous in that the charge amount of the signal charge generator 32 (the potential of the floating diffusion 38) cannot be set (to an arbitrary level) at an arbitrary timing.

2) In the second embodiment, the charge amount of the signal charge generator 32 (the potential of the floating diffusion 38) can be set (to an arbitrary level) at an arbitrary timing, but it is disadvantageous in that there is a need for a circuit which controls the power source voltage Vdd at the low level in order to fill the signal charge generator 32 with electrons.

This difference will be described below in detail. According to the scheme of this embodiment, driving is added to use the charge amount of the signal charge generator 32 as the intermediate voltage retained charge amount, as compared with the solid-state imaging device of the related art, but the change is structurally minimized. This relates to the first embodiment. However, saturation is made by the generation of the charges from the charge injection layer 432, so an accumulation time between a readout operation and a next readout operation is needed, and the generation situation of the charges depends on the formation situation of the charge injection layer 432. Thus, control is difficult. Meanwhile, in the second embodiment, saturation can be made at an arbitrary timing (at the moment the power source voltage Vdd is set at the low level to turn on the reset transistor 36 and the readout selection transistor 34), so excellent controllability is achieved. Further, in the case of the 3-TR type, a scheme is provided which sets the power source voltage Vdd at the low level. Therefore, if this scheme can be used, an additional circuit is not added, and a scratched pixel is not needed.

<Imaging Apparatus: Third Embodiment>

FIG. 9 is a diagram showing the schematic structure of an imaging apparatus of a third embodiment which uses the same scheme as the solid-state imaging device of the first or second embodiment. In the third embodiment, the scheme of the intermediate voltage setting adjustment processing which is used in each embodiment of the above-described solid-state imaging device 1 is applied to an imaging apparatus which is an example of a physical information acquisition apparatus. FIG. 9 is a schematic structure diagram of an imaging apparatus 8. Main components will be described below (descriptions of portions other than the main components will be omitted).

The imaging apparatus 8 includes an imaging lens 802, an optical low pass filter 804, a color filter group 812, a pixel array unit 10, a driving controller 7, a column AD converter 26, a reference signal generator 27, and a camera signal processor 810. As indicated by a dotted line in the drawing, an infrared light cut filter 805 for reducing an infrared light component may be provided together with the optical low pass filter 804. The camera signal processor 810 which is provided at the back of the column AD converter 26 has an imaging signal processor 820, and a camera controller 900 which functions as a main controller for controlling the entire imaging apparatus 8. The imaging signal processor 820 has a single separator 822, a color signal processor 830, a luminance signal processor 840, and an encoder group 860.

The camera controller 900 of this embodiment has a microprocessor 902, a ROM (Read Only Memory) 904 as a read-only storage unit, a RAM 906 (Random Access Memory), and other peripheral members (not shown). The microprocessor 902 is the same as the core section of an electronic calculator, a representative example of which is a CPU (Central Processing Unit) in which functions of operations and controls executed by a computer are integrated in a micro integrated circuit. The RAM 906 is an example of a volatile storage unit in which writing and reading are possible when needed. The microprocessor 902, the ROM 904, and the RAM 906 are also collectively called a microcomputer.

The camera controller 900 controls the entire system, and with regard to the intermediate voltage setting adjustment processing of this embodiment, has a function to perform the data processing or determination processing regarding the intermediate retained charge amount Qm and controls the power source unit 300. A part of or all of processing regarding the intermediate voltage setting adjustment processing are removed from the system controller 20b (not shown) of the driving controller 7 and implanted in the camera controller 900. A part of or all of the functional portions of the data processing regarding the intermediate retained charge amount Qm in the digital arithmetic unit 29a or 29b are also implanted in the camera controller 900. In the structure in which the functional portions are all implanted in the camera controller 900, the camera controller 900 functions as an example of a pixel driving voltage adjustment apparatus which performs the intermediate voltage setting adjustment processing (pixel driving voltage adjustment processing) on the transfer signal TRG. In the structure in which the functional portions are all implanted in the camera controller 900, the system controller 20b, the digital arithmetic unit 29a, and the like in the solid-state imaging device 1, which have functional portions being not implanted, and the camera controller 900 form the pixel driving voltage adjustment apparatus which performs the intermediate voltage setting adjustment processing (pixel driving voltage adjustment processing).

The ROM 904 stores a control program of the camera controller 900 and the like. In particular, in this example, the ROM 904 stores a program that enables the camera controller 900 to control the intermediate voltage setting adjustment processing. The RAM 906 stores data or the like for various kinds of processing by the camera controller 900.

The camera controller 900 is structured such that a recording medium 924, such as a memory card or the like can be detachably mounted thereon, or connection to a communication network, such as Internet or the like, is possible. For example, the camera controller 900 includes a memory readout unit 907 and a communication I/F (interface) 908, in addition to the microprocessor 902, the ROM 904, and the RAM 906.

The recording medium 924 is used to register program data which causes the microprocessor 902 to execute software processing, and various kinds of data, such as the set values of various kinds of control information for a convergence range or exposure control processing (including electronic shutter control) of photometric data DL based on a luminance system signal from the luminance signal processor 840, or the like. The memory readout unit 907 stores (installs) data read from the recording medium 924 on the RAM 906. The communication I/F 908 relays exchange of communication data with the communication network, such as Internet or the like.

While in such an imaging apparatus 8, the driving controller 7 and the column AD converter 26 are shown in the shape of a module which is separate from the pixel array unit 10, as described regarding the solid-state imaging device 1, a solid-state imaging device 1 having a one-chip structure may be used in which the driving controller 7 and the column AD converter 26 are formed integrally on the same semiconductor substrate together with the pixel array unit 10. Referring to the drawing, the imaging apparatus 8 includes the optical systems, such as the imaging lens 802, the optical low pass filter 804, the infrared light cut filter 805, or the like, in addition to the pixel array unit 10, the driving controller 7, the column AD converter 26, the reference signal generator 27, and the camera signal processor 810. This structure is suitable for a case where the units are put together in the shape of a packaged module having an imaging function. Such an imaging apparatus 8 is provided as a camera or a portable apparatus having an imaging function which is used for "imaging". The term "imaging" includes the capture of an image at the time of the normal camera photographing, and in broad sense, fingerprint detection or the like.

With the imaging apparatus 8 configured as above, the camera controller 900 supplies the voltage setting TS to the power source unit 300, and carries out the intermediate voltage setting adjustment processing of the above-described embodiment to specially set the intermediate voltage level of the transfer driving voltage levels of the transfer signal TRG. Therefore, the intermediate voltage which becomes the expectation value of the intermediate retained charge amount Qm can be appropriately set without depending on the device or use environment.

While the invention has been described in connection with the embodiments, the embodiments are not intended to limit the technical scope of the invention. Various changes or improvements may be made within the scope without departing from the gist of the invention, and the changes or improvements also fall within the technical scope of the invention.

The foregoing embodiments are not intended to limit the inventions described in the appended claims. All combinations of the features described in the embodiments are not always indispensable for the solving means of the invention. Inventions at various stages are included in the embodiments. Various inventions can be extracted by appropriate combinations of plural disclosed elements. Even though several elements are deleted from all the elements described in the embodiments, the elements from which the several elements are deleted can be extracted as inventions as long as effects are obtained.

For example, the intermediate voltage setting adjustment processing of this embodiment relates to the readout section of the signal charge from the charge generator 32, and is applied to the scheme which carries out the readout operation using the intermediate voltage. The invention may be applied to any device insofar as it includes the charge generator and the charge transfer unit. The invention may also be applied to a charge transfer-type solid-state imaging device, a representative example of which is a CCD image sensor.

The present application contains subject matter related to that disclosed in Japanese Priority Patent Application JP 2008-279472 filed in the Japan Patent Office on Oct. 30, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state imaging device comprising:
   a pixel array unit having arranged unit pixels, each of which has (1) a charge generator that generates signal charges and (2) a signal output unit having a charge transfer unit for (a) transferring the signal charges generated by the charge generator and (b) generating and outputting a processing-target signal corresponding to the signal charges generated by the charge generator;
   a driving controller that drives the unit pixels, the driving controller sequentially driving the charge transfer unit at a plurality of different transfer driving voltage levels; and
   a transfer driving voltage setting unit that sets, on the basis of (1) a pixel signal based on a saturated charge amount when the charge generator is saturated and (2) a pixel signal based on an intermediate voltage retained charge amount which is retained in the charge generator after an intermediate transfer in which charge transfer is performed in a state where a transfer driving voltage level is at a level between (a) a complete transfer level which enables the saturated charge amount of the charge generator to be completely transferred to the signal output unit and (b) an off level which turns off the charge transfer unit, a level of an intermediate voltage being such that an actual intermediate voltage retained charge amount becomes an expectation value of the intermediate voltage retained charge amount.

2. The solid-state imaging device according to claim 1, further comprising:

a signal processor that, on the basis of (1) the pixel signal based on the saturated charge amount when the charge generator is saturated and (2) the pixel signal based on an intermediate voltage retained charge amount which is retained in the charge generator in a state where the transfer driving voltage level is at a level between (a) the complete transfer level which enables the saturated charge amount of the charge generator to be completely transferred to the signal output unit and (b) the off level which turns off the charge transfer unit, calculates an index value such that the transfer driving voltage setting unit sets the level of the intermediate voltage to a suitable value, wherein, the transfer driving voltage setting unit (1) compares the index value calculated by the signal processor with the expectation value of the intermediate voltage retained charge amount and (2) sets the level of the intermediate voltage on the basis of a comparison result.

3. The solid-state imaging device according to claim 1, wherein the transfer driving voltage setting unit is configured to:

acquire an index value for a determination from the signal processor, which is externally provided, and calculate the index value for determination on the basis of (1) the pixel signal based on the saturated charge amount when the charge generator is saturated and (2) the pixel signal based on the intermediate voltage retained charge amount which is retained in the charge generator in a state where the transfer driving voltage level is at a level between (a) the complete transfer level which enables the saturated charge amount of the charge generator to be completely transferred to the signal output unit and the (b) off level which turns off the charge transfer unit; and compare the acquired index value with the expectation value of the intermediate voltage retained charge amount, and sets the level of the intermediate voltage on the basis of the comparison result.

4. The solid-state imaging device according to any one of claims 1 to 3, wherein:

with a charge accumulation time of complete transfer being Tlsh, a readout time of the complete transfer being Tl, a charge accumulation time of intermediate transfer being Tssh, a readout time of the intermediate transfer being Ts, the saturated charge amount being Qs, an intermediate retained charge amount of the intermediate transfer being Qm, an intermediate transfer charge amount which is read out by the intermediate transfer being Qn, and a complete transfer charge amount which is read out by the complete transfer being Ql, then, the relationships $Ql=(Tl-Tlsh)/(Ts-Tssh) \times Qn$ and $Ql=(Tl-Ts)/(Tssh-Tlsh) \times Qm+Qm$ hold true, and the intermediate voltage retained charge amount Qm which satisfies the relationship $Qm \geqq Tssh-Tlsh)/(Tl-Ts+Tssh-Tlsh) \times Qs$ is the expectation value of the intermediate voltage retained charge amount.

5. The solid-state imaging device according to any one of claims 1 to 3, wherein:

a member, which performs charge injection such that the charge generator is saturated, is in the unit pixel of a portion of the pixel array unit; and the intermediate voltage retained charge amount is the charge amount when the intermediate transfer has been performed on the unit pixel subjected to the charge injection.

6. The solid-state imaging device according to any one of claims 1 to 3, wherein:

each unit pixel has a switch unit which comprises a semiconductor device, the driving controller turns on the semiconductor device at a predetermined timing to perform charge injection such that the charge generator is saturated, and the intermediate voltage retained charge amount is the charge amount when the intermediate transfer has been performed on the unit pixel subjected to the charge injection.

7. An imaging apparatus comprising:

a pixel array unit having arranged unit pixels, each of which has (1) a charge generator generating signal charges and (2) a signal output unit having a charge transfer unit for (a) transferring the signal charges generated by the charge generator and (b) generating and outputting a processing-target signal corresponding to the signal charges generated by the charge generator;

a driving controller that drives the unit pixels, the driving controller sequentially driving the charge transfer unit at a plurality of different transfer driving voltage levels; and a signal processor that, on the basis of (1) a pixel signal based on a saturated charge amount when the charge generator is saturated and (2) a pixel signal based on an intermediate voltage retained charge amount which is retained in the charge generator in a state where a transfer driving voltage level is at a level between (a) a complete transfer level which enables the saturated charge amount of the charge generator to be completely transferred to the signal output unit and (b) an off level which turns off the charge transfer unit, calculates an index value for determination such that a transfer driving voltage setting unit sets the level of an intermediate voltage to a suitable value, wherein, the transfer driving voltage setting unit that compares the index value for determination calculated by the signal processor with an expectation value of the intermediate voltage retained charge amount, and sets a level of the intermediate voltage such that an actual intermediate voltage retained charge amount becomes an expectation value of the intermediate voltage retained charge amount.

8. A pixel driving voltage adjustment apparatus comprising:

a signal processor that (A) acquires, from a solid-state imaging device having arranged unit pixels, each of which has (1) a charge generator generating signal charges and (2) a signal output unit having a charge transfer unit for (a) transferring the signal charges generated by the charge generator and (b) generating and outputting a processing-target signal corresponding to the signal charges generated by the charge generator, (1) a pixel signal based on a saturated charge amount when the charge generator is saturated and (2) a pixel signal based on an intermediate voltage retained charge amount which is retained in the charge generator in a state where a transfer driving voltage level is at a level between (a) a complete transfer level which enables the saturated charge amount of the charge generator to be completely transferred to the signal output unit and (b) an off level which turns off the charge transfer unit, and (B) calculates an index value for determination on the basis of respective pixel signals such that a transfer driving voltage setting unit sets the level of the intermediate voltage to a suitable value, wherein, the transfer driving voltage setting unit that compares the index value for determination calculated by the signal processor with an expectation value of the intermediate voltage retained charge amount, and sets the level of the intermediate voltage such that an actual intermediate voltage retained charge amount becomes an expectation value of the intermediate voltage retained charge amount.

9. A pixel driving voltage adjustment method comprising the steps of:

acquiring from a solid-state imaging device having arranged unit pixels, each of which has (1) a charge generator generating signal charges and (2) a signal output unit having a charge transfer unit for (a) transferring the signal charges generated by the charge generator and (b) generating and outputting a processing-target signal corresponding to the signal charges generated by the charge generator, (1) a pixel signal based on a saturated charge amount when the charge generator is saturated and (2) a pixel signal based on an intermediate voltage retained charge amount which is retained in the charge generator in a state where a transfer driving voltage level is at a level between (a) a complete transfer level which enables the saturated charge amount of the charge generator to be completely transferred to the signal output unit and (b) an off level which turns off the charge transfer unit;

calculating an index value for determination on the basis of respective pixel signals; and comparing the index value with an expectation value of the intermediate voltage retained charge amount, and setting a level of an intermediate voltage such that an actual intermediate voltage retained charge amount becomes the expectation value of the intermediate voltage retained charge amount.

* * * * *